(12) United States Patent
Yamamoto et al.

(10) Patent No.: US 10,896,336 B2
(45) Date of Patent: Jan. 19, 2021

(54) PARKING COMPARTMENT RECOGNITION APPARATUS

(71) Applicant: DENSO TEN Limited, Kobe (JP)

(72) Inventors: Tetsuo Yamamoto, Kobe (JP); Hiroaki Sano, Kobe (JP); Akihiko Shiotani, Kobe (JP); Hiroki Morinaga, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 16/412,511

(22) Filed: May 15, 2019

(65) Prior Publication Data

US 2019/0392229 A1    Dec. 26, 2019

(30) Foreign Application Priority Data

Jun. 25, 2018   (JP) ................................. 2018-120241
Jun. 25, 2018   (JP) ................................. 2018-120242
Jan. 31, 2019   (JP) ................................. 2019-016335

(51) Int. Cl.
  *G06K 9/00*   (2006.01)
  *B60R 11/04*   (2006.01)
  *G08G 1/14*   (2006.01)

(52) U.S. Cl.
  CPC .......... *G06K 9/00812* (2013.01); *B60R 11/04* (2013.01); *G08G 1/143* (2013.01)

(58) Field of Classification Search
  CPC .... G06K 9/00812; B60R 11/04; G08G 1/143; G08G 1/168; B62D 15/0285; B62D 15/027; B62D 15/028; B62D 15/029; G06T 2207/30264; G01S 2015/936; G01S 2013/9314; G01S 2015/932;
  (Continued)

(56) References Cited

U.S. PATENT DOCUMENTS

2005/0174429 A1*  8/2005  Yanai .................. B60R 1/00
                                               348/148
2008/0007618 A1*  1/2008  Yuasa .................. B60R 1/00
                                               348/118
(Continued)

FOREIGN PATENT DOCUMENTS

JP  2017-076275 A      4/2017
JP  2018-101443   *    6/2018  ............ G07F 7/088
JP  2018-101443 A      6/2018

OTHER PUBLICATIONS

U.S. Appl. No. 16/270,038, filed Feb. 7, 2019 in the name of Yamamoto et al.

*Primary Examiner* — Brian Wilson

(74) *Attorney, Agent, or Firm* — Oliff PLC

(57) ABSTRACT

To provide a parking space recognition apparatus that can reduce a processing load for detecting the parking space. The parking space recognition apparatus recognizes a parking space by using images generated by four cameras to be mounted on a vehicle. In the parking space recognition apparatus, an image acquisition part acquires the images generated by the cameras. A detection setter selects the cameras to be used for detecting the parking space from among the cameras based on a traveling state of the vehicle. A parking space detector acquires the images generated by the cameras selected by the detection setter from the image acquisition part, and detects the parking space from the acquired images.

8 Claims, 23 Drawing Sheets

(58) Field of Classification Search
CPC ......... G01S 2015/933; G01S 2015/934; G01S 2015/935
See application file for complete search history.

(56) References Cited

U.S. PATENT DOCUMENTS

2017/0249840 A1\* 8/2017 Singh .................... G08G 1/141
2019/0039606 A1\* 2/2019 Fujita ................ B62D 15/0285

\* cited by examiner

SETTING TABLE 19

| MODE ID | TRAVELING STATE | | | | OPERATION MODE | | | |
|---|---|---|---|---|---|---|---|---|
| | TRAVELING DIRECTION | SPEED | ROTATION ANGLE | LOCATION | FIRST DETECTOR | | SECOND DETECTOR | |
| | | | | | USED CAMERA | DETECTION MODE | USED CAMERA | DETECTION MODE |
| 1 | MOVE FORWARD | 8KM/H OR MORE | | | LEFT SIDE CAMERA | SIMPLE | RIGHT SIDE CAMERA | SIMPLE |
| 2 | | NOT LESS THAN 4KM/H AND NOT MORE THAN 8KM/H | 200° OR MORE TO LEFT | | RIGHT SIDE CAMERA | SIMPLE | REAR CAMERA | SIMPLE |
| 3 | | | LESS THAN 200° | | RIGHT AND LEFT SIDE CAMERAS (ALTERNATELY) | SIMPLE | REAR CAMERA | SIMPLE |
| 4 | | | 200° OR MORE TO RIGHT | | LEFT SIDE CAMERA | SIMPLE | REAR CAMERA | SIMPLE |
| 5 | | 4KM/H OR LESS | 200° OR MORE TO LEFT | | RIGHT SIDE CAMERA | SIMPLE | REAR CAMERA | SIMPLE AND DETAILED (ALTERNATELY) |
| 6 | | | LESS THAN 200° | | RIGHT AND LEFT SIDE CAMERAS (ALTERNATELY) | SIMPLE | REAR CAMERA | SIMPLE AND DETAILED (ALTERNATELY) |
| 7 | | | 200° OR MORE TO RIGHT | | LEFT SIDE CAMERA | SIMPLE | REAR CAMERA | SIMPLE AND DETAILED (ALTERNATELY) |
| 8 | MOVE BACKWARD | | | OUTSIDE COMPARTMENT | REAR CAMERA | SIMPLE | REAR CAMERA | DETAILED |
| 9 | | | | INSIDE COMPARTMENT | LEFT SIDE CAMERA | DETAILED | RIGHT SIDE CAMERA | DETAILED |

FIG. 10

COMPARTMENT LIST 18

| ID | DETECTION TIME | PARKING REFERENCE POSITION | FIRST STARTING POINT | SECOND STARTING POINT | RELIABI -LITY |
|---|---|---|---|---|---|
| 1 | 2018/7/1 14:35:41.320 | (Xs1, Ys1) | (Xp1, Yp1) | (Xm1, Ym1) | F1 |
| 2 | 2018/7/1 14:35:41.320 | (Xs2, Ys2) | (Xp2, Yp2) | (Xm2, Ym2) | F2 |
| 3 | 2018/7/1 14:35:41.320 | (Xs3, Ys3) | (Xp3, Yp3) | (Xm3, Ym3) | F3 |

FIG. 16

PARKING COMPARTMENT RECOGNITION APPARATUS

BACKGROUND OF THE INVENTION

Field of the Invention

The invention relates to a parking compartment recognition apparatus that detects a parking position of a vehicle from an image captured by a camera mounted on the vehicle.

Description of the Background Art

In order to reduce a burden on a driver who parks the vehicle, a parking assistance apparatus that detects the parking compartment to park the vehicle, and controls the vehicle to park within a range of the detected parking compartment has been proposed.

For example, in Japanese published unexamined application No. 2017-27405, a parking guidance apparatus that detects a vacant parking compartment from an image captured by a camera installed in a vehicle is disclosed. When the parking guidance apparatus detects a parking sign having a predetermined pattern from the image captured by the camera, the parking guidance apparatus determines that a host vehicle can be parked in the parking compartment with the detected parking sign.

In this way, the conventional parking assistance apparatus detects the parking compartment from each of four images captured by four cameras installed in a front, rear, left and right side of the vehicle. That is, in the parking assistance apparatus, there has been a problem that a processing load for detecting the parking compartment increases as a number of the cameras increases.

SUMMARY OF THE INVENTION

According to one aspect of the invention, a parking space recognition apparatus includes an image acquisition part, a detection setter, a detection area specifying part and a parking space detector. The image acquisition part acquires a plurality of images generated by a plurality of cameras provided on a vehicle including (i) a left side camera capturing a left side view of the vehicle, (ii) a right side camera capturing a right side view of the vehicle and (iii) a rear camera capturing a rear view of the vehicle. The detection setter selects the cameras to be used for detecting the parking space from among the plurality of cameras based on a traveling state of the vehicle, and selects a detection mode for detecting the parking space from the images generated by the selected cameras from among a first mode and a second mode based on the traveling state of the vehicle. The detection area specifying part specifies a first predetermined detection area in the images generated by the selected cameras among the plurality of images acquired by the image acquisition part when the detection setter selects the first mode, and specifies a second detection area narrower than the first detection area in the images generated by the selected cameras when the detection setter selects the second mode. The parking space detector detects the parking space from the first detection area specified by the detection area specifying part with a first accuracy when the detection setter selects the first mode, and detects the parking space from the second detection area specified by the detection area specifying part with a second accuracy when the detection setter selects the second mode.

As a result, since both the detection mode and the images to be used for detecting the parking space are changed according to the traveling state of the vehicle, a load for detecting the parking space can be reduced.

According to another aspect of the invention, the detection setter assigns the left side camera and the right side camera to the first detector and assigns the rear camera to the second detector. The first detector alternately repeats a process for detecting the parking space from the images generated by the left side camera and the process for detecting the parking space from the images generated by the right side camera. The second detector detects the parking space from the images generated by the rear camera.

Thus, since the left side camera and the right side camera are assigned to the first detector, and the rear camera is assigned to the second detector, the parking space located on a lateral and rear side of the vehicle can be detected in real time.

Therefore, an object of the invention is to provide a parking space recognition apparatus that can reduce a processing load for detecting the parking space.

These and other objects, features, aspects and advantages of the invention will become more apparent from the following detailed description of the invention when taken in conjunction with the accompanying drawings.

BRIEF DESCRIPTION OF THE DRAWINGS

FIG. 10 illustrates one example of a setting table that is stored in a memory shown in FIG. 4;

FIG. 16 illustrates one example of a compartment list shown in FIG. 4;

DESCRIPTION OF THE EMBODIMENTS

Figure 1:
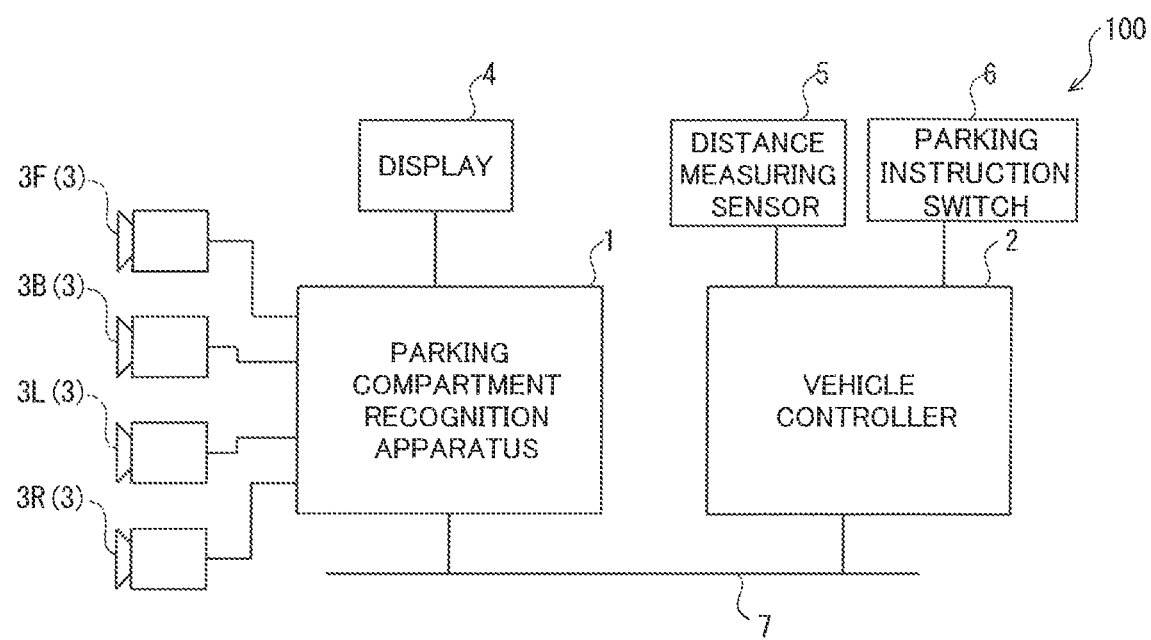
FIG. 1 is a functional block diagram illustrating a configuration of a parking assistance system that includes a parking compartment recognition apparatus according to an embodiment.

Embodiments of the invention will be hereinafter described in detail with reference to accompanying drawings. In the drawings, the same and equivalent parts are designated by the same reference numerals and letters, and the description thereof will not be repeated.

[1. Configuration of Parking Assistance System 100]

[1.1 Overall Configuration]

FIG. 1 is a functional block diagram illustrating a configuration of a parking assistance system 100 that includes a parking compartment recognition apparatus 1 according to this embodiment. With reference to FIG. 1, the parking assistance system 100 is mounted on a vehicle, such as an automobile. The parking assistance system 100 assists a driver when the driver parks the vehicle within a parking compartment. A definition of the parking compartment will be described later.

The parking assistance system 100 includes the parking compartment recognition apparatus 1, a vehicle controller 2, four cameras 3, a display 4, a distance measuring sensor 5 and a parking instruction switch 6.

The parking compartment recognition apparatus 1 and the vehicle controller 2 are CAN (Controller Area Network) nodes and connected via a bus 7. Although not shown in FIG. 1, the bus 7 is also connected to an ECU (Electronic Control Unit) other than the parking compartment recognition apparatus 1 and the vehicle controller 2.

When the parking compartment recognition apparatus 1 detects the parking compartment from one or more frame (s) generated by the four cameras 3, the parking compartment recognition apparatus 1 informs the vehicle controller 2 of the detected parking compartment. When the parking compartment recognition apparatus 1 receives information of a desired parking compartment from the vehicle controller 2, the parking compartment recognition apparatus 1 generates video data including the received information of the desired parking compartment. The parking compartment recognition apparatus 1 outputs the generated video data to the display 4. The desired parking compartment is, as described later, the parking compartment selected by the driver.

The vehicle controller 2 selects the desired parking compartment from the parking compartments informed by the parking compartment recognition apparatus 1 according to an operation of the driver. The vehicle controller 2 outputs the selected desired parking compartment to the parking compartment recognition apparatus 1. The vehicle controller 2 assists a parking operation by the driver by controlling a front wheel steering angle when moving the vehicle to the selected desired parking compartment.

Each of the cameras 3 includes a lens and an imaging element, and captures an image of surroundings of the vehicle. The cameras 3 include a front camera 3F, a rear camera 3B, a left side camera 3L and a right side camera 3R. Each of the cameras 3 generates a moving image including a plurality of frames, and supplies the generated moving image to the parking compartment recognition apparatus 1 in a frame unit.

The display 4 is, for example, a liquid crystal display. The display 4 receives the video data from the parking compartment recognition apparatus 1, and displays a video of surroundings of the vehicle based on the received video data.

The distance measuring sensor 5 is, for example, an ultrasonic sonar. In FIG. 1, only one distance measuring sensor is shown, but in fact, the parking assistance system 100 includes a plurality of distance measuring sensors 5. The distance measuring sensor 5 is arranged on a side surface and a rear end surface of the vehicle. The distance measuring sensor 5 detects a distance between the vehicle and an obstacle.

The parking instruction switch 6 is used when the driver instructs the parking assistance system 100 to start parking assistance.

[1.2 Definition of World Coordinate System]

Figure 2:
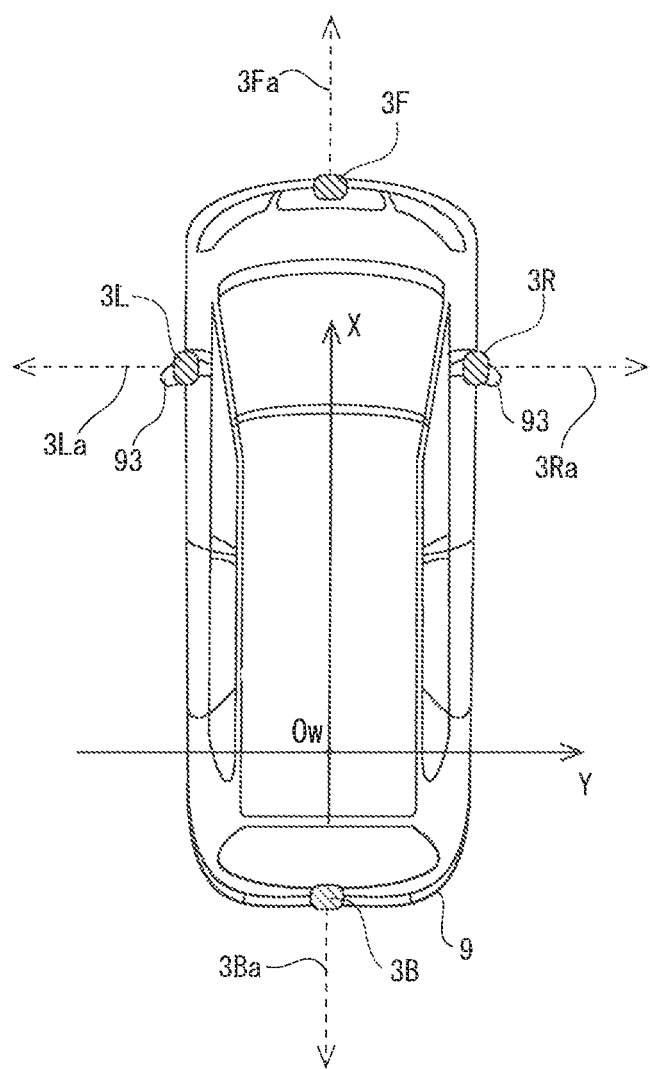
FIG. 2 illustrates a world coordinate system that is set by the parking compartment recognition apparatus shown in FIG. 1.

FIG. 2 illustrates a world coordinate system that is set by the parking compartment recognition apparatus 1. With reference to FIG. 2, the parking assistance system 100 shown in FIG. 1 is mounted on a vehicle 9. In the world coordinate system, an origin Ow of the world coordinate system is a midpoint of a rear wheel rotating shaft of the vehicle 9.

An X axis extends in a straight traveling direction of the vehicle 9, and is a straight line passing through a center of gravity of the vehicle 9. A positive direction of the X axis is a direction from the rear end surface toward a front end surface of the vehicle 9. A Y axis extends in a direction perpendicular to both the straight traveling direction and a vertical direction of the vehicle 9, and corresponds to the rear wheel rotating shaft of the vehicle 9. A positive direction of the Y axis is a direction from a left side surface toward a right side surface of the vehicle 9. That is, the origin Ow is the midpoint of the rear wheel rotating shaft of the vehicle 9.

[1.3. Definition of Terms]

Figure 3:
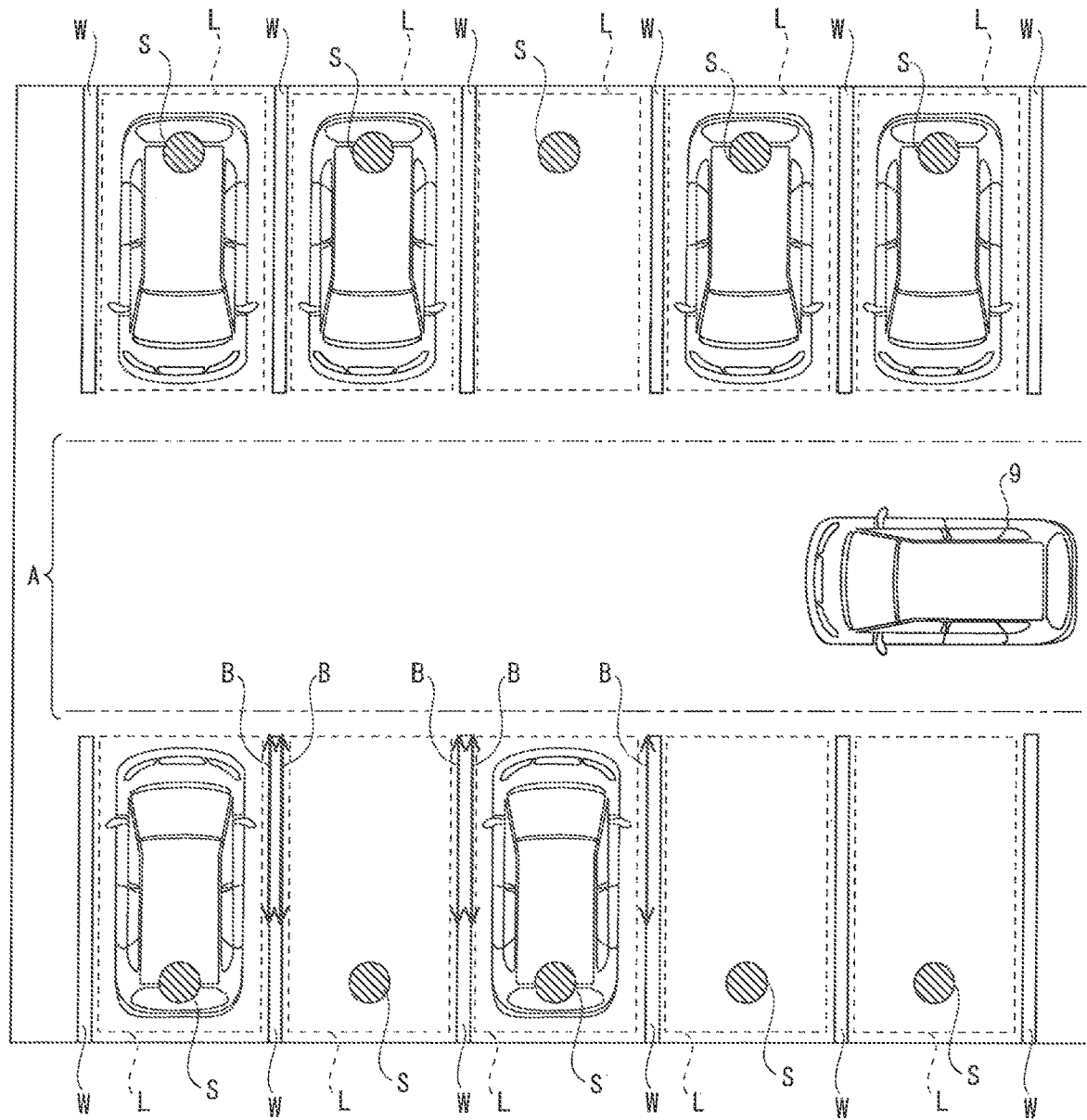
FIG. 3 illustrates one example of parking compartments that are recognized by the parking compartment recognition apparatus shown in FIG. 1.

Terms used for describing the parking compartment recognition apparatus 1 are hereinafter described. FIG. 3 illustrates one example of a parking lot in which the parking compartments are set. Although a parking compartment L is actually in contact with a white line W, the parking compartment L is shown away from the white line W in FIG. 3 for convenience of description. This applies to the figures other than FIG. 3.

The parking compartment L more commonly called a "parking space" is an area that is set to park the vehicle in the parking lot. The parking compartment recognition apparatus 1 recognizes the parking compartment L regardless of whether or not the vehicle is parked. In this embodiment, the parking compartment L is a rectangle, and a long side of the parking compartment L is perpendicular to a traveling road A.

The white line W is a line to show a range of the parking compartment L to the driver. In this embodiment, a case in which a compartment line is white will be described, but the compartment line does not have to be white.

A border line B is a longitudinal side of the white line W, and specifies a width of the parking compartment L. The border line B is a part of the long side of the parking compartment L, and a part of the long side of the white line W. That is, the border line B is a part of an outline of each of the parking compartment L and the white line W. In FIG. 3, some of the border lines B are denoted by signs.

A parking reference position S is set as a guide for stopping the vehicle 9 when parking the vehicle 9 in one parking compartment L. Specifically, the parking reference position S is a position of the origin Ow in a case where parking of the vehicle 9 in one parking compartment L has been completed. When the origin Ow corresponds to the parking reference position S, and the X axis of the world coordinate system described later corresponds to a center line of the parking compartment L, the parking assistance system 100 determines that a process for parking the vehicle 9 in the parking compartment L has been completed. The parking reference position S is set for each of the parking compartments L regardless of whether or not another vehicle is parked in the parking compartment L.

The parking compartment recognition apparatus 1 uses a parking reference position and a starting point of the border line B as parameters to show a position of the parking compartment L. The starting point of one border line B is an end point of two end points of one border line B which is close to the traveling road A.

[1.4. Arrangement of Cameras 3]

With reference to FIG. 2, the front camera 3F is provided near an installation position of a license plate at a front end of the vehicle 9, and an optical axis 3Fa of the front camera 3F is directed in the positive direction of the X axis. The rear camera 3B is provided near an installation of a license plate at a rear end of the vehicle 9, and an optical axis 3Ba of the rear camera 3B is directed in a negative direction of the X axis. It is desirable that the installation positions of the front camera 3F and the rear camera 3B are on the X axis, but may deviate a little from the X axis.

The front camera 3F captures a front view of the vehicle 9 to generate a front frame 31F, and supplies the generated front frame 31F to the parking compartment recognition apparatus 1. The rear camera 3B captures a rear view of the vehicle 9 to generate a rear frame 31B, and supplies the generated rear frame 31B to the parking compartment recognition apparatus 1.

The left side camera 3L is provided on a left door mirror 93, and an optical axis 3La of the left side camera 3L is directed in a negative direction of the Y axis. The left side camera 3L captures a left side view of the vehicle 9 to generate a left side frame 31L, and supplies the generated left side frame 31L to the parking compartment recognition apparatus 1.

The right side camera 3R is provided on a right door mirror 93, and an optical axis 3Ra of the right side camera 3R is directed in the positive direction of the Y axis. The right side camera 3R captures a right side view of the vehicle to generate a right side frame 31R, and supplies the generated right side frame 31R to the parking compartment recognition apparatus 1.

The lens of each of the cameras 3 is a wide angle lens having an angle of view of 180° or more. Therefore, the parking assistance system 100 is capable of capturing all surrounding images of the vehicle 9.

[1.5. Configuration of Parking Compartment Recognition Apparatus 1]

Figure 4:
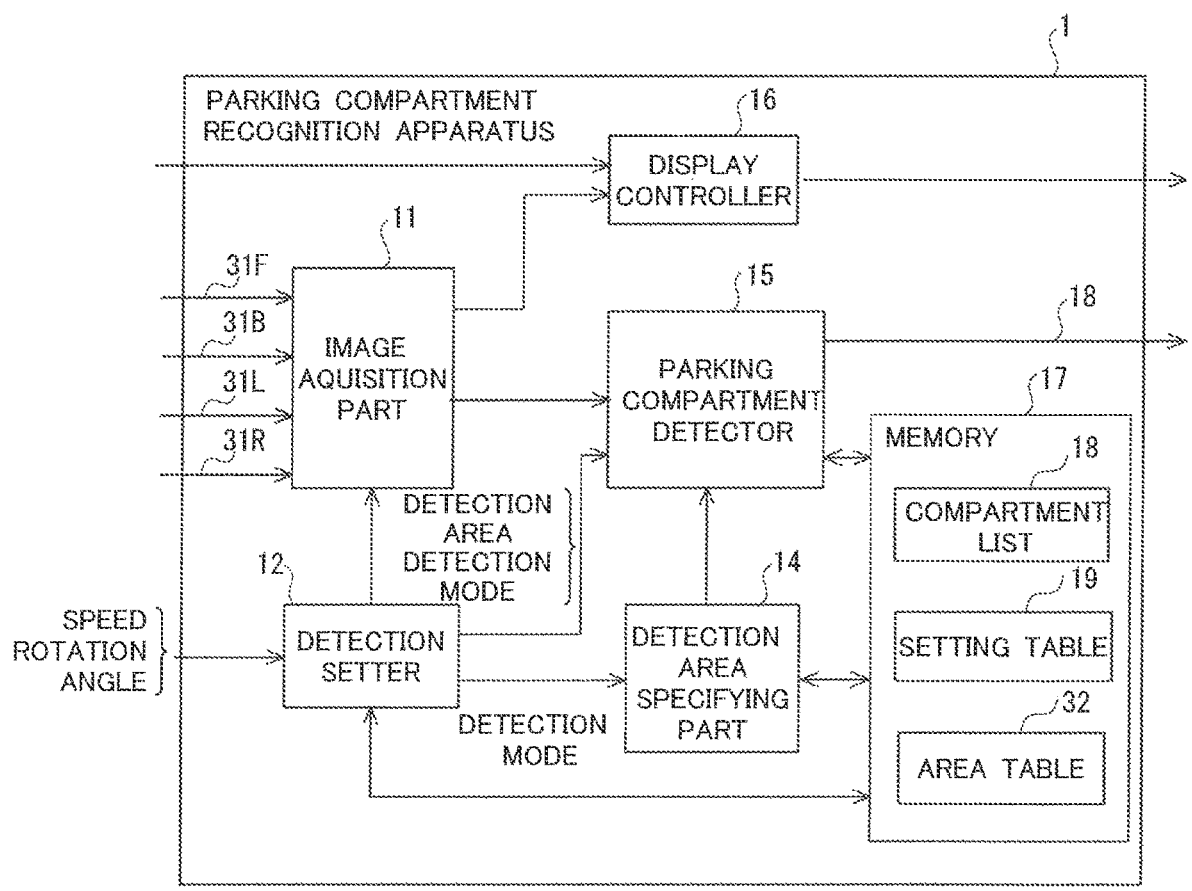
FIG. 4 is a functional block diagram illustrating a configuration of the parking compartment recognition apparatus shown in FIG. 1.

FIG. 4 is a functional block diagram illustrating a configuration of the parking compartment recognition apparatus 1 shown in FIG. 1. With reference to FIG. 4, the parking compartment recognition apparatus 1 includes an image acquisition part 11, a detection setter 12, a detection area specifying part 14, a parking compartment detector 15, a display controller 16 and a memory 17.

The image acquisition part 11 acquires the frame from each of the cameras 3. The image acquisition part 11 outputs the frame(s) captured by one or more camera (s) selected by the detection setter 12 among the acquired frames to the parking compartment detector 15.

The detection setter 12 selects two cameras to be used for detecting the parking compartment L from the cameras 3 based on a traveling state of the vehicle 9. The traveling state includes, for example, a speed of the vehicle 9, a rotation angle of a steering wheel of the vehicle 9, a traveling direction of the vehicle 9, a position of the vehicle 9, and the like. The traveling direction indicates whether the vehicle 9 moves forward or backward. The detection setter 12 informs the image acquisition part 11 and the detection area specifying part 14 of the selected cameras.

The detection setter 12 determines a detection mode of the parking compartment detector 15 based on the traveling state of the vehicle 9. Specifically, the detection setter 12 determines one of a simple mode and a detailed mode to be the detection mode of the parking compartment detector 15. The detailed mode has a higher accuracy in detecting the parking compartment than the simple mode. When the simple mode is selected, the parking compartment L is detected in a wider range than when the detailed mode is selected. Specifically, when the simple mode is selected, the detection area specifying part 14 specifies a predetermined detection area L in an area table 32, and the parking compartment detector 15 detects the parking compartment L from the specified detection area. On the other hand, when the detailed mode is selected, the detection area specifying part 14 specifies a detection area based on the parking reference position S that has been already detected. As a result, it is possible to determine the parking reference position S of the parking compartment L detected in the simple mode with a further higher accuracy. Details of the simple mode and the detailed mode will be described later.

The detection area specifying part 14 specifies the detection areas of the frames generated by the cameras selected by the detection setter 12. The detection area is determined based on the detection mode of the parking compartment detector 15.

When the detection mode is the simple mode, the parking compartment detector 15 detects the parking compartment L from the frames received from the image acquisition part 11 with a first accuracy. When the detection mode is the detailed mode, the parking compartment detector 15 detects the parking compartment L from the frames received from the image acquisition part 11 with a second accuracy. Specifically, the parking compartment detector 15 detects the border line B from the detection area specified by the detection area specifying part 14, and detects the parking compartment L based on the detected border line B. The parking compartment detector 15 generates a compartment list 18 in which the detected parking compartment has been recorded, and outputs the compartment list 18 to the vehicle controller 2.

When the vehicle 9 moves backward, the display controller 16 generates a parking assistance image including the rear frame 31B, and outputs the generated parking assistance image to the display 4. The display controller 16 acquires the traveling direction of the vehicle 9, for example, from a shift position sensor (not shown).

The memory 17 is a non-volatile storage device, and stores the compartment list 18, a setting table 19 and the area table 32. The compartment list 18 records the parking compartment L detected by the parking compartment detector 15. The setting table 19 records the cameras and the detection mode that are used when detecting the parking compartment L. The area table 32 records the detection area that is specified when the parking compartment detector 15 detects the parking compartment L in the simple mode.

The parking compartment recognition apparatus 1 selects at least one camera from among the cameras 3 based on the traveling state of the vehicle 9, and detects the parking compartment L from the frames generated by at least one selected camera. As a result, the parking compartment recognition apparatus 1 can prevent detection accuracy of the parking compartment L from lowering, even when all the cameras cannot be used for detecting the parking compartment L.

The parking compartment recognition apparatus 1 changes the detection mode based on the traveling state of the vehicle 9. As a result, the parking compartment recognition apparatus 1 reduces a processing load for detecting the parking compartment L without lowering the detection accuracy of the parking compartment L when parking the vehicle 9.

[1.6. Configuration of Parking Compartment Detector 15]

Figure 5:
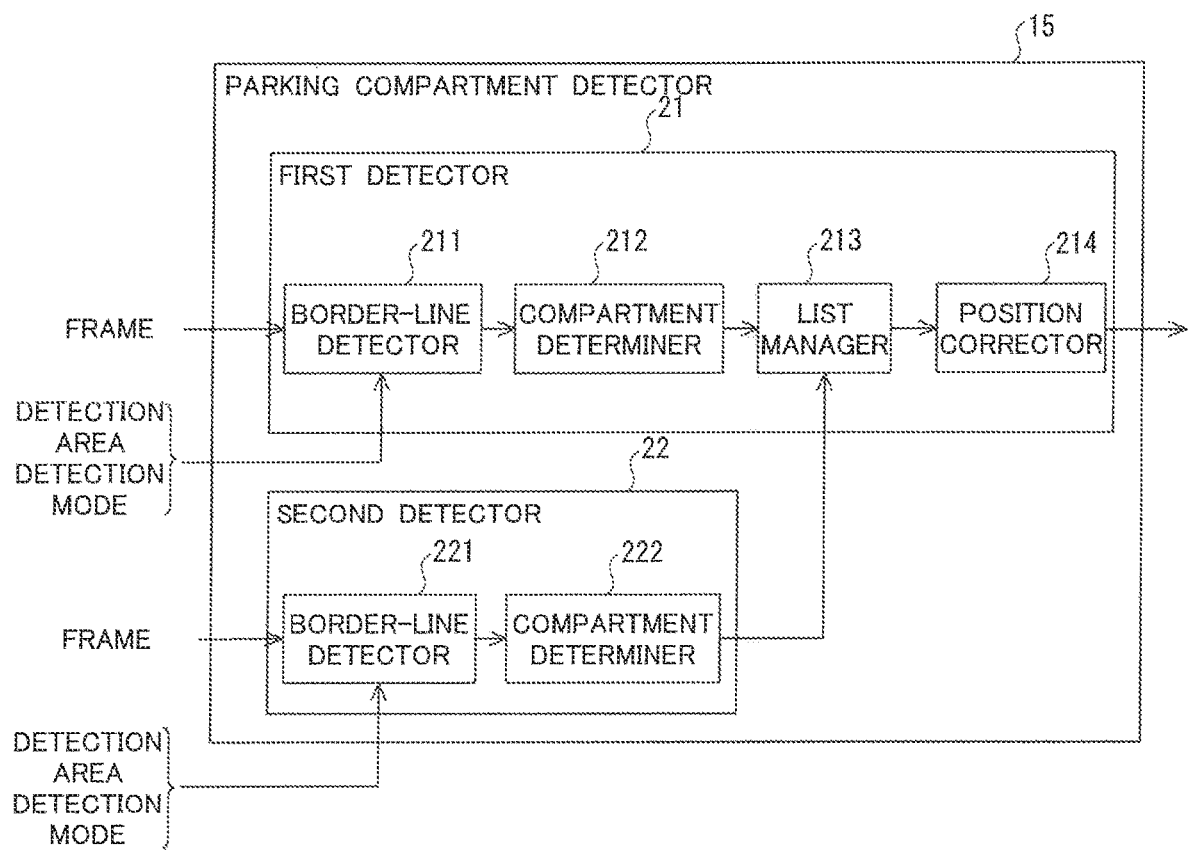
FIG. 5 is a functional block diagram illustrating a configuration of a parking compartment detector shown in FIG. 4.

FIG. 5 is a functional block diagram illustrating a configuration of the parking compartment detector 15 shown in FIG. 4. With reference to FIG. 5, the parking compartment detector 15 includes a first detector 21 and a second detector 22.

The first detector 21 and the second detector 22 detect the parking compartment L from the frames. The first detector 21 and the second detector 22 are microcontrollers, and independently detect the parking compartment L, respectively. The first detector 21 and the second detector 22 may use an FPGA (Field Programmable Gate Array) that can be programmed after manufacturing an integrated circuit and a reconfigurable processor that can reconfigure a connection and setting of a circuit cell inside the integrated circuit.

The first detector 21 detects the parking compartment from the frame generated by one camera of two cameras selected by the detection setter 12. The first detector 21 includes a border-line detector 211, a compartment determiner 212 and a position corrector 214.

The border-line detector 211 detects the border line B from the frame generated by one camera, and outputs a position of the detected border line B to the compartment determiner 212. The position of the border line B is described in the world coordinate system, and includes positions of two end points of the border line B.

The compartment determiner 212 receives the position of the border line B from the border-line detector 211, and determines the parking compartment L based on the received position of the border line B. The compartment determiner 212 outputs the position of the determined parking compartment L to a list manager 213. The position of the parking compartment L is described in the world coordinate system, and includes the parking reference position S and a position of the starting point of each of two border lines.

The list manager 213 updates the position of the parking compartment that is recorded in the compartment list 18 based on the position of the parking compartment L determined by the compartment determiner 212 and a compartment determiner 222.

The position corrector 214 corrects the position of the parking compartment L added to the compartment list 18 based on a moving amount of the vehicle 9 during a period between a generation time of the frames by the cameras 3 and a present time. Furthermore, the position corrector 214 corrects the position of the parking compartment L that has been already recorded in the compartment list 18 based on the moving amount of the vehicle 9 during a period between a previous correction time and the present time. The moving amount of the vehicle 9 is identified based on the speed of the vehicle 9 and the rotation angle of the steering wheel of the vehicle 9. The position corrector 214 stores the compartment list 18 in which the position of the parking compartment L has been corrected in the memory 17, and outputs the compartment list 18 to the vehicle controller 2.

The second detector 22 detects the parking compartment L from the frame generated by the other camera of two cameras selected by the detection setter 12. The second detector 22 includes a border-line detector 221 and the compartment determiner 222.

The border-line detector 221 detects the border line B from the frame generated by the other camera. The compartment determiner 222 determines the parking compartment L based on the position of the border line B detected by the border-line detector 221, and outputs the position of the determined parking compartment L to the list manager 213.

In FIG. 5, a case in which the first detector 21 includes the list manager 213 and the position corrector 214 has been described, but is not limited thereto. The second detector 22 may include the list manager 213 and the position corrector 214. In this case, the second detector 22 updates the compartment list 18 and corrects the position of the parking compartment L recorded in the compartment list 18 instead of the first detector 21 when a load on the first detector 21 is higher than a predetermined threshold value.

[2. Operation Outline]

Figure 6:
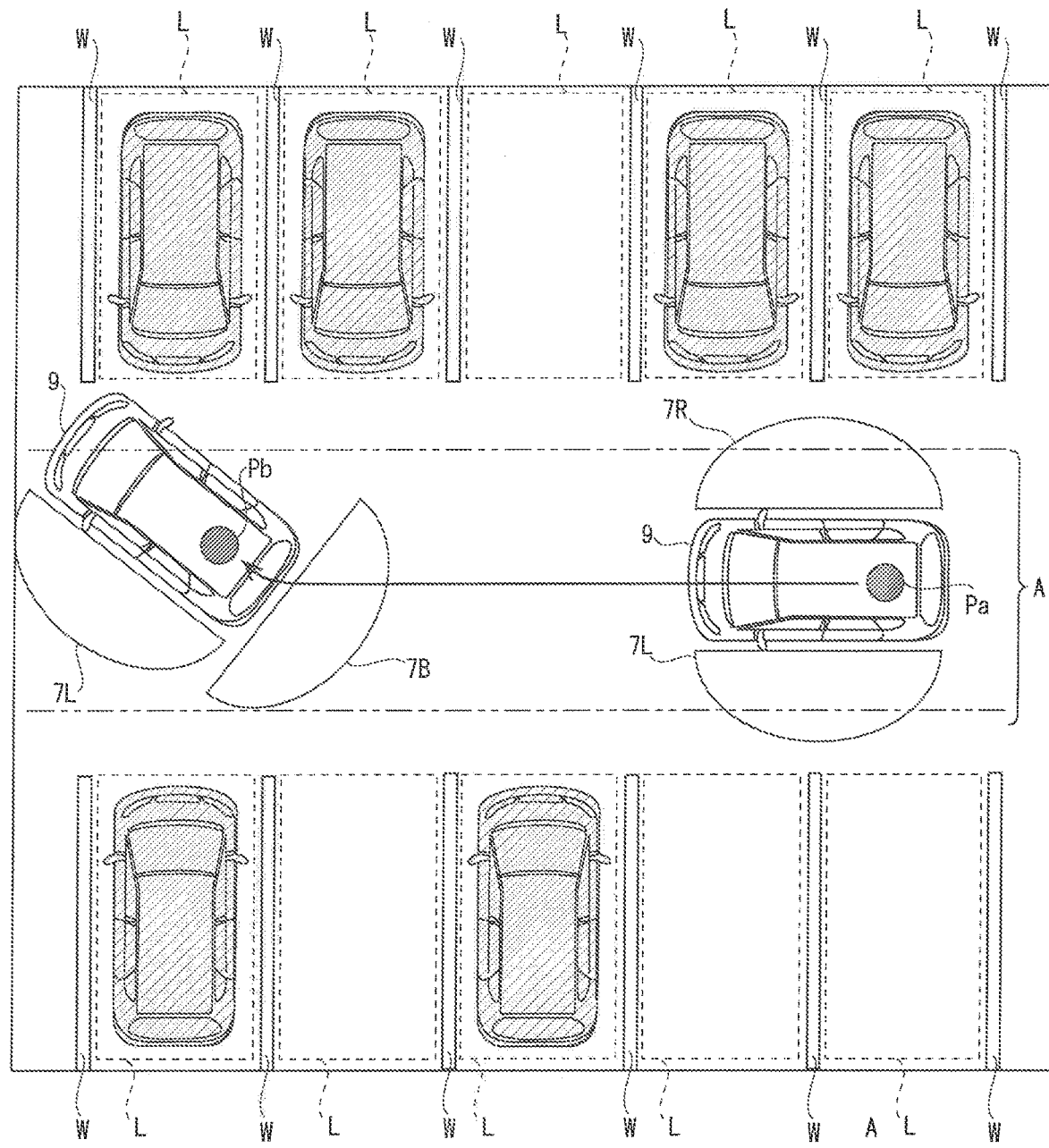
FIG. 6 illustrates one example of changing one or more camera(s) to be selected by the parking compartment recognition apparatus 1 shown in FIG. 1.

FIG. 6 illustrates changing the cameras to be used by the parking compartment recognition apparatus 1. With reference to FIG. 6, a case in which the vehicle 9 moves from a position Pa to a position Pb is assumed. FIG. 6 conveniently shows imaging areas 7L, 7R and 7B that can be captured by each of the left side camera 3L, the right side camera 3R and the rear camera 3B, and the imaging areas 7L, 7R and 7B are not actual imaging areas to be captured by these cameras.

The parking compartment recognition apparatus 1 switches the cameras to be used for detecting the parking compartment L according to the traveling state of the vehicle 9. For example, when the vehicle 9 moving forward and the speed of the vehicle 9 is 10 km/h at the position Pa, the parking compartment recognition apparatus 1 selects the left side camera 3L and the right side camera 3R, and detects the parking compartment L from the left side frame 31L and the right side frame 31R. When the vehicle 9 is moving forward and the speed of the vehicle 9 is 10 km/h, there is a low possibility that the vehicle 9 immediately starts to perform a backward parking. The parking compartment recognition apparatus 1 uses the left side camera 3L and the right side camera 3R to detect the parking compartment L from a wide area on left and right sides of the vehicle 9.

When the vehicle 9 is moving forward, the speed of the vehicle 9 is 2 km/h and the steering wheel of the vehicle 9 is turned 250° clockwise at the position Pb, the parking compartment recognition apparatus 1 uses the left side camera 3L and the rear camera 3B to recognize the parking compartment L. In this case, there is a high possibility that the vehicle 9 moves backward after stopping, and moves into the parking compartment L that is located on a left rear side of the vehicle 9. The parking compartment recognition apparatus 1 uses the left side camera 3L and the rear camera 3B to detect the parking compartment L from a left-rear side area of the vehicle 9. That is, the parking compartment recognition apparatus 1 selects the cameras that capture an outside area of a turning track of the vehicle 9 from among the cameras 3.

As described above, the parking compartment recognition apparatus 1 selects the cameras to be used for detecting the parking compartment L according to the traveling state of the vehicle 9. As a result, the parking compartment recognition apparatus 1 reduces the processing load for detecting the parking compartment L. Furthermore, the parking compartment recognition apparatus 1 changes the images to be used for detecting the parking compartment L according to the position of the vehicle 9, the speed of the vehicle 9, the rotation angle of the steering wheel of the vehicle 9, the traveling direction of the vehicle 9, and the like.

The parking compartment recognition apparatus 1 changes processing contents of detecting the parking compartment L based on the traveling state of the vehicle 9. Specifically, the parking compartment recognition apparatus 1 determines one of the simple mode and the detailed mode to be the detection mode of the parking compartment. The parking compartment recognition apparatus 1 detects the parking compartment L from the frames generated by the selected cameras in the determined detection mode.

The parking compartment recognition apparatus 1 specifies an area to be detected for the parking compartment L. The detection areas to be specified in the frames differ between the simple mode and the detailed mode.

Figure 7:
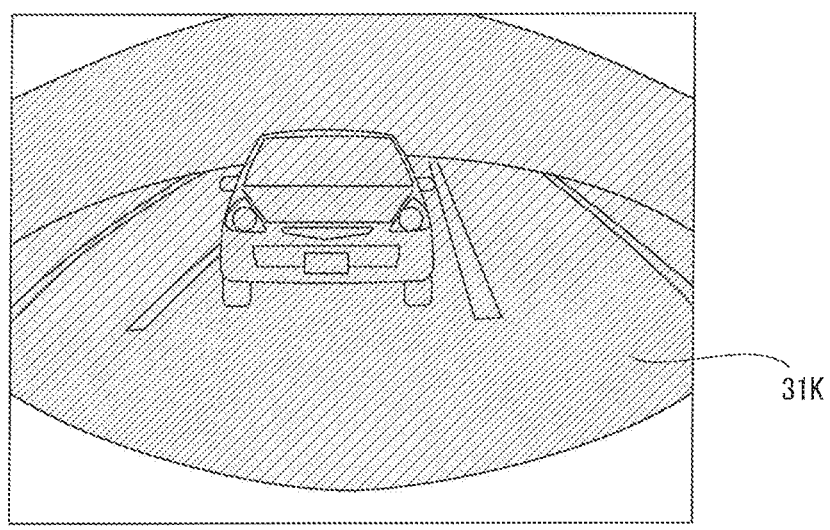
FIG. 7 illustrates one example of a detection area that is specified in a frame generated by the camera shown in FIG. 1.

FIG. 7 illustrates one example of the detection area that is specified in the left side frame 31L when the simple mode is set. With reference to FIG. 7, when the simple mode is set, the parking compartment recognition apparatus 1 sets an area 31K in which a vehicle body of the vehicle 9 is not reflected in the left side frame 31L as the detection area.

Figure 8:
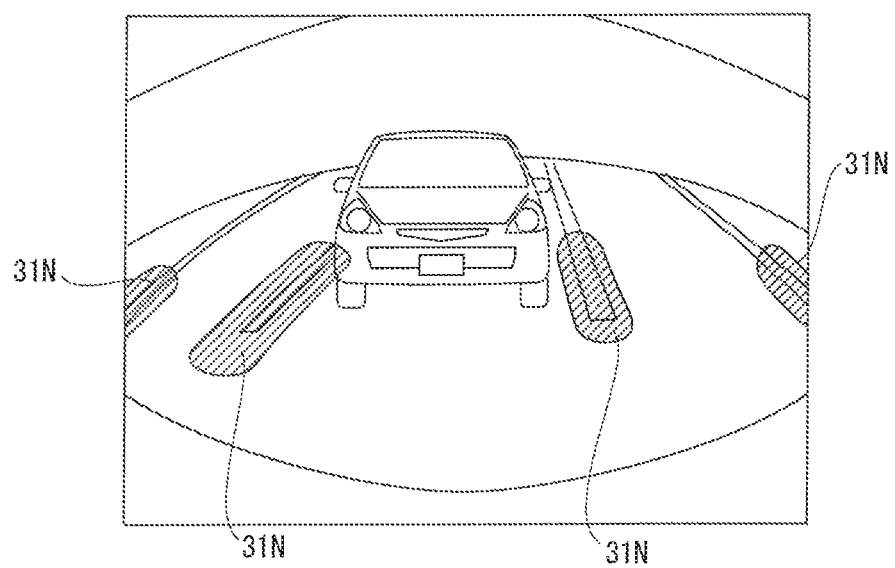
FIG. 8 illustrates another example of detection areas that are specified in the frame generated by the camera shown in FIG. 1.

FIG. 8 illustrates one example of the detection areas that are specified in the left side frame 31L when the detailed mode is set. With reference to FIG. 8, when the detailed mode is set, the parking compartment recognition apparatus 1 sets a plurality of areas 31N in which each of white lines W is assumed to appear in the left side frame 31L as the detection areas. The areas 31N are specified based on past detection results of the parking compartment L.

That is, when the simple mode is selected, the parking compartment L is detected in a wider range and more roughly than when the detailed mode is selected. When the simple mode is determined, the parking compartment recognition apparatus 1 can easily select a new parking compartment. On the other hand, when the detailed mode is selected, the parking compartment L is detected in a narrower range and with a higher accuracy than when the simple mode is selected. Therefore, a processing load on the parking compartment recognition apparatus 1 is equal between the simple mode and the detailed mode.

As described above, the parking compartment recognition apparatus 1 uses one of the simple mode and the detailed mode according to the traveling state of the vehicle 9. As a result, it is possible to reduce the processing load without lowering detection performance of the parking compartment L.

[3. Operation of Parking Assistance System 100]

[3.1. Operation of Parking Compartment Recognition Apparatus 1]

Figure 9:
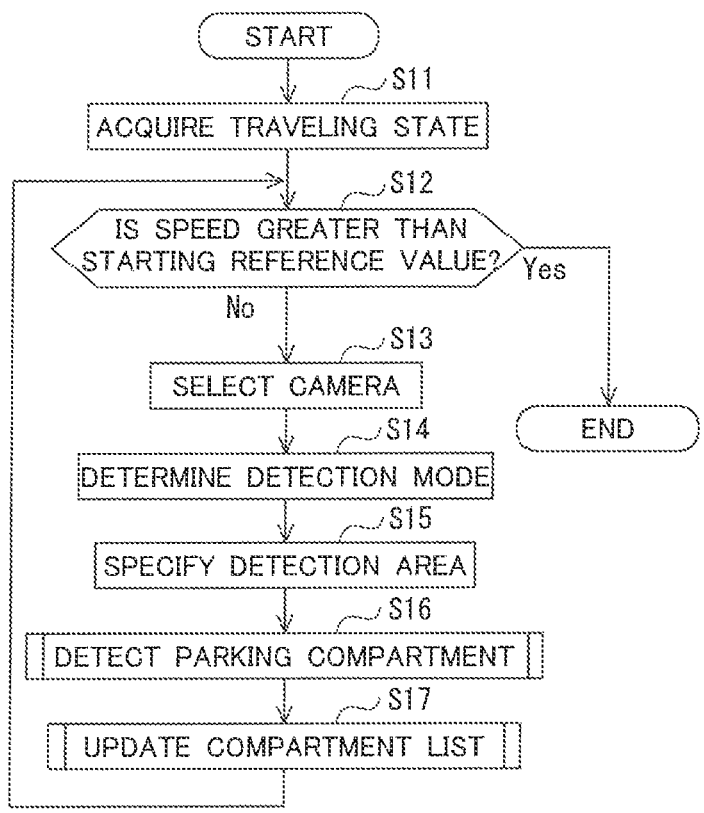
FIG. 9 is a flowchart illustrating an operation of the parking compartment recognition apparatus shown in FIG. 1.

FIG. 9 is a flowchart illustrating an operation when the parking compartment recognition apparatus 1 shown in FIG. 1 detects the parking compartment L. A process shown in FIG. 9 is started when the speed of the vehicle 9 is equal to or lower than a predetermined starting reference value. The starting reference value is, for example, 20 km/h. At a time point at which the process shown in FIG. 9 has been started, the cameras are not selected and the detection mode is not determined.

When an ignition switch is turned on, the parking compartment recognition apparatus 1 may start the process shown in FIG. 9 regardless of the speed of the vehicle 9.

With reference to FIG. 9, the detection setter 12 acquires the traveling state of the vehicle 9 (a step S11). For example, the detection setter 12 acquires the speed of the vehicle 9 from a speed sensor (not shown), and acquires the rotation angle of the steering wheel of the vehicle 9 from a rotation angle sensor (not shown). The detection setter 12 acquires the traveling direction of the vehicle 9 from the shift position sensor (not shown).

The detection setter 12 determines whether or not the speed of the vehicle 9 acquired in the step S11 is greater than the starting reference value (a step S12). When the speed of the vehicle 9 is greater than the starting reference value (Yes in the step S12), the parking compartment recognition apparatus 1 ends the process shown in FIG. 9. On the other hand, when the speed of the vehicle 9 is equal to or lower than the starting reference value (No in the step S12), the detection setter 12 moves to a step S13.

The detection setter 12 selects two cameras to be used for detecting the parking compartment L from among the cameras 3 based on the traveling state acquired in the step S11 (the step S13). In the step S13, the setting table 19 stored in the memory 17 is referenced. A number of the selected cameras is smaller than the number of the cameras 3. As a result, even when the parking compartment detector 15 cannot simultaneously detect the parking compartment L from the images generated by each of the cameras 3, the parking compartment can be detected.

FIG. 10 illustrates one example of the setting table 19 that is stored in the memory 17. With reference to FIG. 10, for example, when the vehicle 9 is moving forward at a speed of 10 km/h, the detection setter 12 determines that the traveling state of the vehicle 9 corresponds to a mode ID "1", and selects the left side camera 3L and the right side camera 3R. Based on the setting table 19, the left side camera 3L is assigned to the first detector 21, and the right side camera 3R is assigned to the second detector 22. That is, by the step S13, the detection setter 12 determines the frames in which each of the first detector 21 and the second detector 22 detects the parking compartment L.

The detection setter 12 determines the detection modes of the first detector 21 and the second detector 22 based on the traveling state acquired in the step S11 (a step S14). In the step S14, the setting table 19 stored in the memory 17 is referenced. With reference to FIG. 10, for example, when the traveling mode of the vehicle 9 corresponds to the mode ID "1", the detection setter 12 determines the detection modes of both the first detector 21 and the second detector 22 to be the simple mode.

The detection area specifying part 14 specifies the detection areas of the frames in which each of the first detector 21 and the second detector 22 detects the parking compartment L (a step S15). For example, when the first detector 21 detects the parking compartment L from the left side frame 31L, the detection areas to be specified in the left side frame 31L differ between the simple mode and the detailed mode. Details of the step S15 will be described later.

The parking compartment detector 15 acquires the frames generated by the cameras selected in the step S13 from the image acquisition part 11, and detects the parking compartment L from the detection areas specified in the acquired frames (a step S16). Each of the first detector 21 and the second detector 22 detects the parking compartment L from the detection areas of the acquired frames according to the detection mode determined in the step S14. Details of the step S16 will be described later.

The parking compartment detector 15 updates the compartment list 18 based on the detection results of the parking compartment L in the step S16 (a step S17). Details of the step S17 will be described later. The parking compartment detector 15 outputs the updated compartment list 18 to the vehicle controller 2.

[3.2. Detection of Parking Compartment (Step S16)]

Prior to a detailed description of specifying the detection area (the step S15), the detection of the parking compartment L (the step S16) will be described. When the detection area specifying part 14 specifies the detection area in the detailed mode, the detection area specifying part 14 uses the parking reference position S and the position of the starting point of the border line B in the parking compartment L previously detected. Therefore, first, a method of identifying the parking reference position S and the position of the starting point of the border line B will be described in detail.

The detection of the parking compartment L will be hereinafter described by taking a case in which the parking compartment L is detected by using the left side frame 31L generated by the left side camera 3L as an example.

Figure 11:
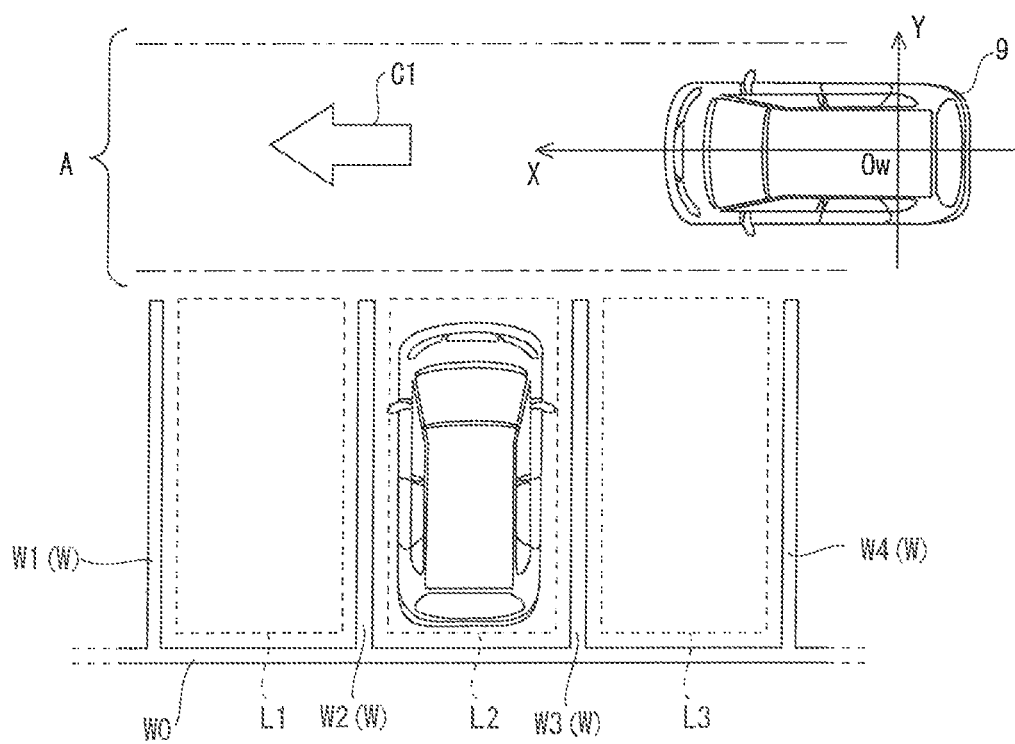
FIG. 11 is a partially enlarged diagram of a part of a parking lot.

FIG. 11 is a partially enlarged diagram of the parking lot shown in FIG. 3. With reference to FIG. 11, it is assumed that the vehicle 9 is traveling on the traveling road A in the parking lot in a direction of an arrow C1. The parking compartment recognition apparatus 1 detects parking compartments L1, L2 and L3 from the left side frame 31L generated by the left side camera 3L. The parking compartment recognition apparatus 1 detects the parking compartment L2 even when another vehicle is parked in the parking compartment L2.

The white lines W that form the parking compartment L1 are described as a white line W1 and a white line W2. The white lines W that form the parking compartment L3 are described as a white line W3 and a white line W4. The parking compartment L2 is formed by the white line W2 and the white line W3.

Figure 12:
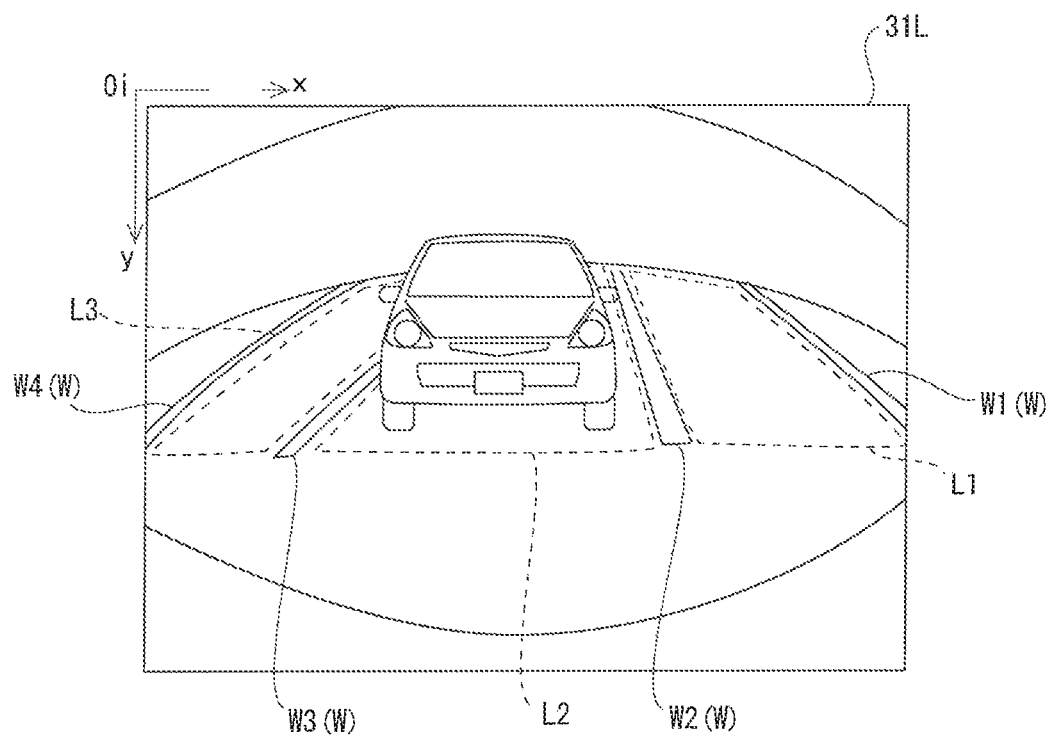
FIG. 12 illustrates one example of the frame generated by a left side camera shown in FIG. 1.

FIG. 12 illustrates one example of the left side frame 31L generated by the left side camera 3L. With reference to FIG. 12, a position of a pixel of the left side frame 31L is represented by a two-dimensional coordinate system in which an upper left vertex is an origin Oi. An x axis extends rightward from the origin Oi, and a y axis extends downward from the origin Oi. The coordinate system defined by the left side frame 31L is described as an "image coordinate system".

(Selection of Attention Pixel)

Figure 13:
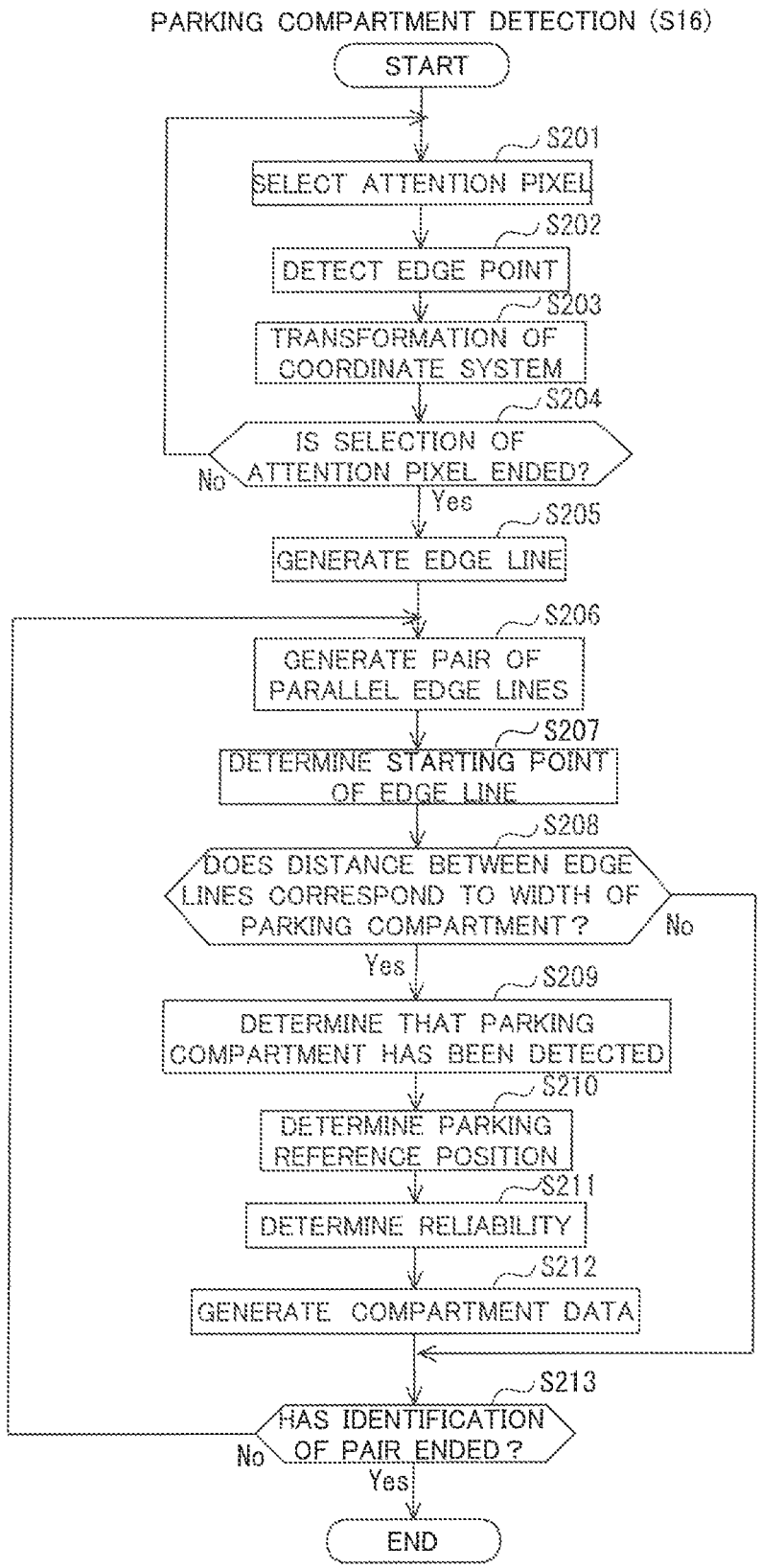
FIG. 13 is a flowchart of a parking compartment detection process shown in FIG. 9.

FIG. 13 is a flowchart of a parking compartment detection process (the step S16). With reference to FIG. 13, the border-line detector 211 selects an attention pixel from among the pixels of the left side frame 31L (a step S201). Selection criteria of the attention pixel differ between the simple mode and the detailed mode.

In the simple mode, the border-line detector 211 intermittently selects the attention pixel. For example, the border-line detector 211 selects the attention pixel at a rate of one in five pixels for an x-axis direction, and selects the attention pixel at a rate of one in three pixels for a y-axis direction. In other words, the border-line detector 211 selects the attention pixel after decimating four pixels for the x-axis direction, and selects the attention pixel after decimating two pixels for the y-axis direction. By intermittently selecting the attention pixel in the simple mode, the processing load caused by detecting the parking compartment L from a wide area is prevented from increasing.

In the detailed mode, the border-line detector 211 selects all the pixels included in the detection area as the attention pixel. As a result, since the border-line detector 211 can accurately detect a direction of the border line B and the position of the starting point, which will be described later, the detection accuracy of the parking compartment L is improved.

In the detailed mode, the border-line detector 211 does not have to select all the pixels included in the detection area as the attention pixel. A selection interval of the attention pixels in the detailed mode may be narrower than the selection interval of the attention pixels in the simple mode.

(Detection of Edge Point)

The border-line detector 211 identifies an adjacent pixel adjacent to the attention pixel selected in the step S201. The border-line detector 211 detects an edge point based on an absolute value of a difference between brightness of the attention pixel and brightness of the adjacent pixel (a step S202). The edge point is a general term for a positive edge point and a negative edge point. The positive edge point is a point at which the brightness increases toward the positive direction of the x axis or y axis, and the calculated absolute value of the difference is greater than a predetermined edge reference value. The negative edge point is a point at which the brightness decreases toward the positive direction of the x axis or y axis, and the calculated absolute value of the difference is greater than the edge reference value.

The border-line detector 211 transforms the position of the detected edge point from the image coordinate system into the world coordinate system (a step S203).

The border-line detector 211 repeats the step S201 to the step S203 until selection of the attention pixel is ended (Yes in a step S204).

(Generation of Edge Line)

The border-line detector 211 generates an edge line by connecting edge points that have been transformed into the world coordinate system in the step S203 (a step S205). The edge line is a general term for a positive edge line and a negative edge line. The positive edge line is generated by connecting two or more positive edge points that are lined up with a shorter distance than a predetermined connection reference value. The negative edge line is generated by connecting two or more negative edge points that are lined up with a shorter distance than the connection reference value. The edge line constitutes a part of the outline of the white line W.

The border-line detector 211 identifies the positive edge line having a bend greater than a predetermined bend reference value among the generated positive edge lines. The border-line detector 211 cuts the identified positive edge line at the positive edge point at which the bend greater than the bend reference value is caused. The bend reference value is, for example, 100. The border-line detector 211 generates a linear edge line to detect the white line W and the border line B that is the outline of the parking compartment L extending in a long-side direction.

Figure 14:
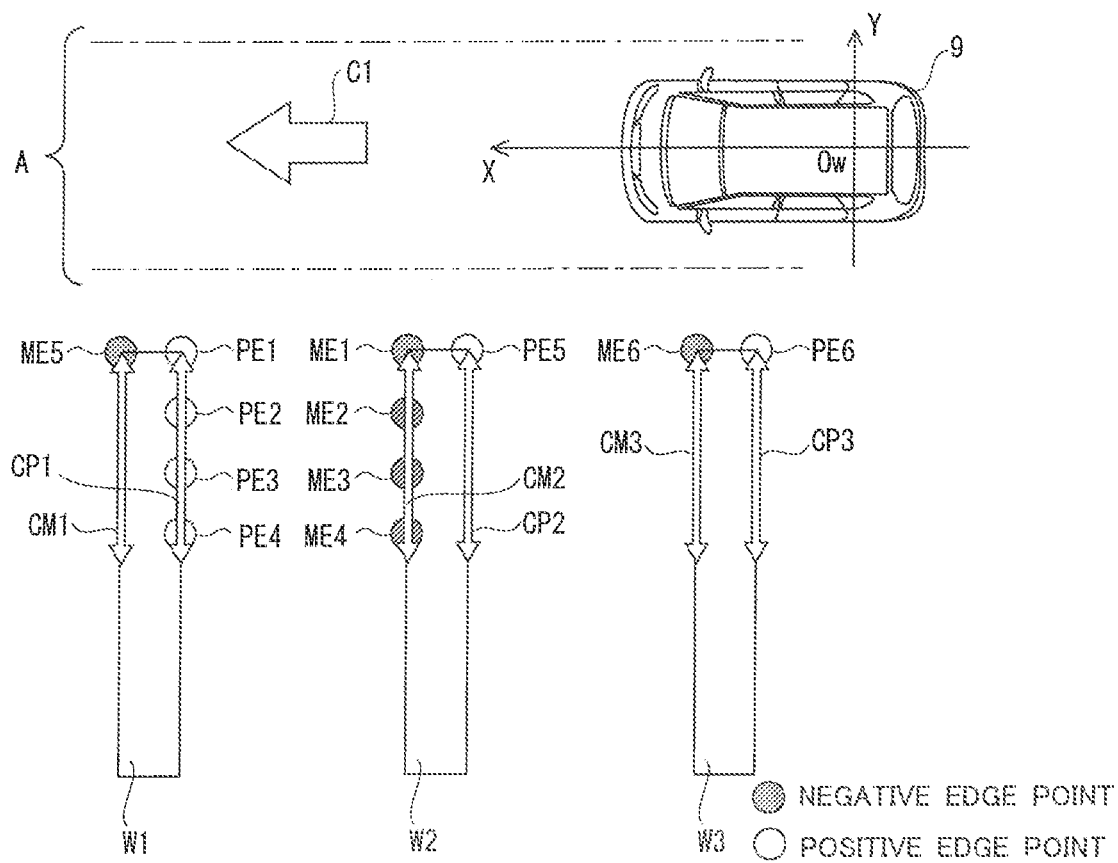
FIG. 14 illustrates one example of edge lines that are generated by a border-line detector shown in FIG. 5.

FIG. 14 illustrates one example of the edge line that is generated in the step S205. In FIG. 14, a width of each of the white lines W1 to W3 is exaggeratingly represented, and indications of the white line W4 and the parking compartments L1 to L3 are omitted.

In the example shown in FIG. 14, a positive edge line CP1 is generated by connecting positive edge points PE1 to PE4. Similarly, positive edge lines CP2 and CP3 are generated. In the positive edge lines CP2 and CP3, indications of the positive edge points other than the positive edge points PE5 and PE6 are omitted.

A negative edge line CM2 is generated by connecting negative edge points ME1 to ME4. Similarly, negative edge lines CM1 and CM3 are generated. In FIG. 14, excluding negative edge points ME5 and ME6, indications of negative edge points that constitute the negative edge lines CM1 and CM3 are omitted.

Although the edge lines shown in FIG. 14 are of the same length, the edge lines that are generated in the step S205 are not always of the same length. When the entire white line W2 appears in the left side frame 31L as shown by the white line W2 in FIG. 12, the border-line detector 211 can detect the edge line corresponding to a length of the long side of the white line W2. However, as shown by the white line W3 in FIG. 12, when a part of the white line W3 is hidden by another vehicle, the border-line detector 211 detects the edge line corresponding to a part of the long side of the white line W3 that appears in the left side frame 31L. In this case, the edge lines that are generated in the step S205 are not of the same length.

(Determination of Parking Compartment L)

The compartment determiner 212 acquires the edge line generated by the border-line detector 211. The compartment determiner 212 generates a pair of the positive edge line and the negative edge line that are parallel to each other from the acquired edge lines (a step S206).

Specifically, the compartment determiner 212 selects one positive edge line and one negative edge line that are adjacent to each other. When an angle that is formed by the selected two edge lines is smaller than a predetermined parallel reference value, the compartment determiner 212 determines that the selected two edge lines are parallel, and generates the pair of the selected two edge lines. The parallel reference value is, for example, 2 degrees.

The compartment determiner 212 determines a position of a starting point of each of the two edge lines constituting the pair generated in the step S206 (a step S207). For example, when the vehicle 9 is outside the parking compartment L, the compartment determiner 212 determines the end point closer to the vehicle 9 among two end points of the positive edge line constituting the pair to be the starting point of the positive edge line. The starting point of the negative edge line constituting the pair is similarly determined.

When the vehicle 9 is within the parking compartment L, the compartment determiner 212 determines the end point having a larger X coordinate value among the two end points of the positive edge line constituting the pair to be the starting point of the positive edge line. The starting point of the negative edge line constituting the pair is similarly determined.

The compartment determiner 212 determines whether or not a distance between the two edge lines constituting the pair corresponds to a width of the parking compartment L (a step S208). Specifically, the compartment determiner 212 calculates a distance between the starting point of the positive edge line and the starting point of the negative edge line as the distance between the two edge lines constituting the pair. The compartment determiner 212 determines whether or not the calculated distance is within a predetermined range corresponding to the width of the parking compartment L. The predetermined range is determined based on a width of a standard passenger car, and is, for example, 2 to 2.5 m.

When the calculated distance is within the predetermined range (Yes in the step S208), the compartment determiner 212 determines that the parking compartment L has been detected based on the two edge lines constituting the pair (a step S209). That is, the compartment determiner 212 determines that the two edge lines constituting the pair are border lines B of the parking compartment L.

As described above, when detected two border lines B are parallel, the compartment determiner 212 determines whether or not these two border lines B form an outline of the parking compartment L based on a distance between these two border lines B. That is, the compartment determiner 212 detects the parking compartment based on a position relation of the detected two border lines. Since lengths of the two border lines do not have to be used for detecting the parking compartment, even when a part of a white line is hidden by an obstacle, the parking compartment can be detected. For example, the parking compartment in which another vehicle has been already parked can be detected.

Figure 15:
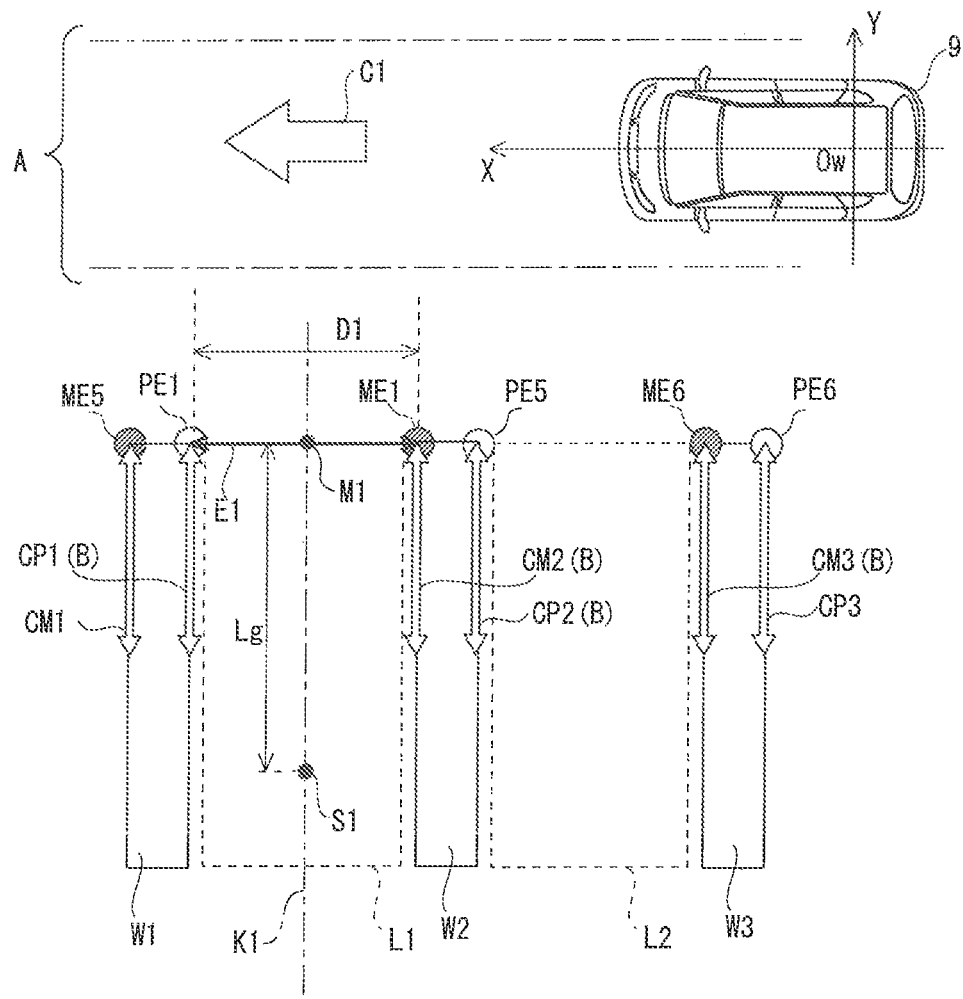
FIG. 15 illustrates one example of the parking compartments that are detected by a compartment determiner shown in FIG. 5.

FIG. 15 illustrates one example of detecting the parking compartment L. With reference to FIG. 15, since the positive edge line CP1 and the negative edge line CM2 which are adjacent to each other are parallel, the compartment determiner 212 generates a pair composed of the positive edge line CP1 and the negative edge line CM2. The positive edge point PE1 is determined to be the starting point of the positive edge line CP1. The negative edge point ME1 is determined to be the starting point of the negative edge line CM2. A distance D1 between the positive edge point PE1 and the negative edge point ME1 is within the predetermined range. Therefore, the compartment determiner 212 determines that a parking compartment L1 has been detected based on the positive edge line CP1 and the negative edge line CM2. The positive edge line CP1 and the negative edge line CM2 are border lines B of the parking compartment L1 extending in a long-side direction.

Since the positive edge line CP1 and the negative edge line CM1 which are adjacent to each other are parallel, the compartment determiner 212 generates a pair composed of the positive edge line CP1 and the negative edge line CM1. The negative edge point ME5 is determined to be the starting point of the negative edge line CM1. The distance D1 between the positive edge point PE1 and the negative edge point ME5 is outside the predetermined range. The distance D1 is a width of the white line W1, and is greatly different from the width of the standard passenger car. As a result, the compartment determiner 212 determines that the pair of the positive edge line CP1 and the negative edge line CM1 does not form the parking compartment L.

Similarly, the compartment determiner 212 detects a parking compartment L2 based on the positive edge line CP2 and the negative edge line CM3. The parking compartment L3 shown in FIG. 11 is similarly detected.

(Determination of Parking Reference Position S)

The compartment determiner 212 determines the parking reference position S of the parking compartment L detected in the step S209 (a step S210). With reference to FIG. 15, the step S210 will be described by taking a case in which a parking reference position S1 of the parking compartment L1 is determined as an example.

The compartment determiner 212 determines a center line K1 of the parking compartment L1 based on the positive edge line CP1 and the negative edge line CM2 which form the border lines B of the parking compartment L1. Specifically, the compartment determiner 212 identifies a line segment E1 connecting the positive edge point PE1 as the starting point of the positive edge line CP1 with the negative edge point ME1 as the starting point of the negative edge line CM2. The compartment determiner 212 determines a linear line that passes through a midpoint M1 of the identified line segment E1 and is parallel to one of the positive edge line CP1 and the negative edge line CM2 to be the center line K1 of the parking compartment L1.

The compartment determiner 212 determines a point that exists on the center line K1 located within the parking compartment L1 and exists at a position a length Lg away from the midpoint M1 to be the parking reference position S1 of the parking compartment L1. The length Lg is determined based on a vehicle length of the vehicle 9. The length Lg is, for example, a distance between a front end surface of the vehicle 9 and the rear wheel rotating shaft of the vehicle 9.

The compartment determiner 212 determines a reliability of the detected parking compartment L (a step S211). The reliability shows certainty of the detected parking compartment L1, and is, for example, a numerical value of not less than 0 and not more than 1. As the reliability becomes closer to 1, a possibility that the detected parking compartment L exists becomes higher.

For example, the reliability is determined based on a length of each of the two edge lines used for identifying the parking compartment L. As the length of each of the two edge lines used for identifying the parking compartment L1 is longer, the reliability becomes closer to 1. Alternatively, the reliability may be determined based on density of each of the two edge lines used for identifying the parking compartment L. For example, as a distance between the positive edge point and the negative edge point is shorter, the reliability becomes closer to 1. That is, when one detection area is detected in both the detailed mode and the simple mode, the reliability of the detailed mode becomes higher than the reliability of the simple mode. This is because, in the detailed mode, the attention pixels are selected more densely than in the simple mode.

The compartment determiner 212 generates compartment data that identifies the detected parking compartment L (a step S212). The compartment data includes the parking reference position S of the detected parking compartment L, the position of the starting point of each of the two edge lines that identify the parking compartment L and the reliability of the parking compartment L. The compartment determiner 212 outputs the generated compartment data to the list manager 213.

The compartment determiner 212 determines whether or not identification of the pair composed of the two edge lines has ended (a step S213). When the identification of the pair has ended (Yes in the step S213), the compartment determiner 212 ends a process shown in FIG. 13. When the identification of the pair has not ended (No in the step S213), the compartment determiner 212 returns to the step S206.

The second detector 22 executes the same process as the first detector 21, detects the parking compartment L from the input frame and outputs the compartment data that identifies the detected parking compartment L to the list manager 213.

[3.3. Updating of Compartment List (Step S17)]

The compartment determiners 212 and 222 respectively output the compartment data that shows the detected parking compartment L to the list manager 213. The list manager 213 updates the compartment list 18 based on the compartment data received from the compartment determiners 212 and 222 (the step S17 shown in FIG. 9).

FIG. 16 illustrates one example of the compartment list 18. With reference to FIG. 16, data (record) of one row is the compartment data that shows each of the parking compartments L. The compartment list 18 records an ID, a detection time, a parking reference position, a first starting point, a second starting point and the reliability. The ID is an identification number that uniquely identifies the parking compartment L recorded in the compartment list 18. The detection time is the generation time of the frame in which the parking compartment L has been detected. The parking reference position, the first starting point, the second starting point and the reliability are the data recorded in the compartment data generated in the step S212. The parking reference position, the first starting point and the second starting point are described in the world coordinate system.

Figure 17:
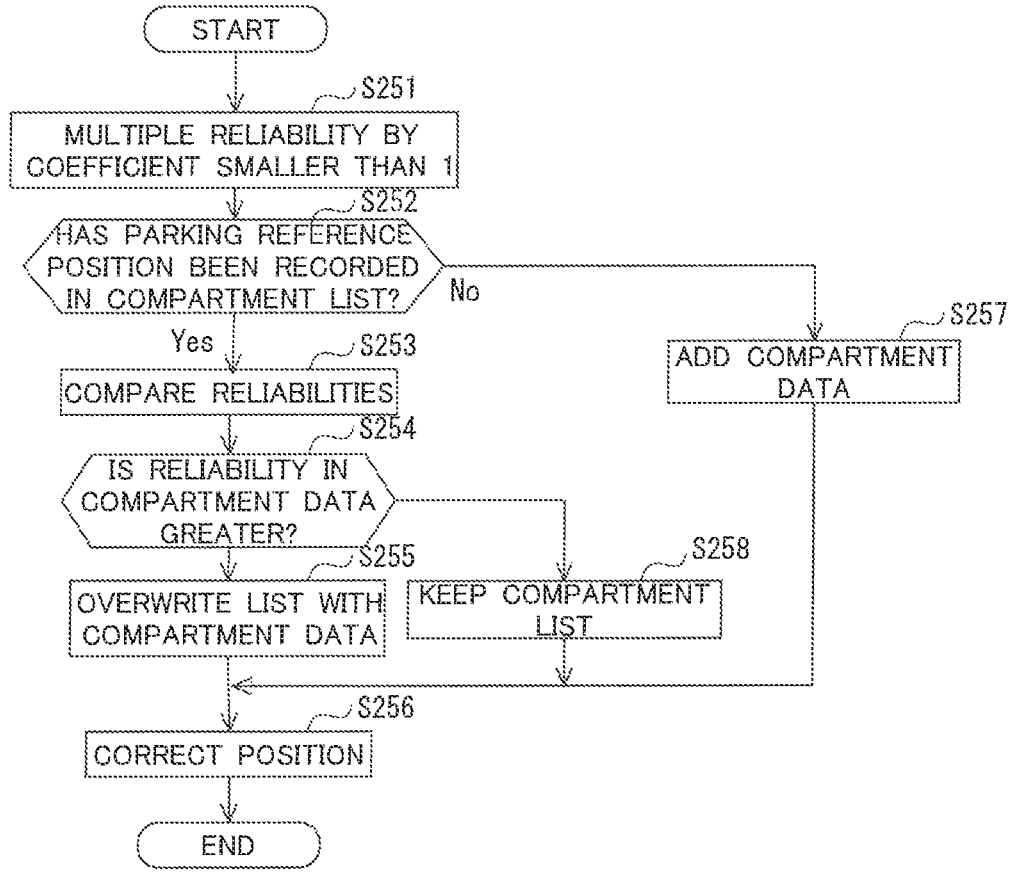
FIG. 17 is a flowchart of an updating process of the compartment list shown in FIG. 16.

FIG. 17 is a flowchart illustrating an operation of the list manager 213. When the list manager 213 has received the compartment data from both the compartment determiner 212 and the compartment determiner 222, the list manager 213 starts a process shown in FIG. 17. The step S17 will be hereinafter described in detail by taking a case in-which the list manager 213 updates the compartment list 18 based on the compartment data of the parking compartment L1 as an example.

First, the list manager 213 multiples all the reliabilities recorded in the compartment list 18 by a coefficient smaller than 1 (a step S251). As a result, the list manager 213 reduces all the reliabilities recorded in the compartment list 18. The reason to execute the step S251 will be described later.

The list manager 213 determines whether or not the parking reference position S1 recorded in the compartment data has been recorded in the compartment list 18 (a step S252). For example, the list manager 213 calculates a distance between the parking reference position of the ID1 and the parking reference position S1 recorded in the compartment data. When the calculated distance is within the predetermined range that shows the same position, the list manager 213 determines that the parking reference position S1 recorded in the compartment data has been recorded in the compartment list 18 (Yes in the step S252).

In this case, the list manager 213 compares the reliability recorded in the compartment data with the reliability of the ID1 recorded in the compartment list 18 (a step S253).

When the reliability recorded in the compartment data is equal to or greater than the reliability of the ID1 (Yes in a step S254), the list manager 213 overwrites a record of the ID1 with the compartment data of the parking compartment L1 (a step S255).

On the other hand, when the reliability recorded in the compartment data is smaller than the reliability of the ID1 (No in the step S254), the list manager 213 keeps the record of the ID1 (a step S258).

The step S252 will be described again. When the parking reference position S1 is not recorded in the compartment list 18 (No in the step S252), the list manager 213 adds the compartment data of the parking compartment L1 to the compartment list 18 (a step S257).

The list manager 213 corrects the parking reference position S of each of the parking compartments recorded in the compartment list 18, the first starting point and the second starting point based on the traveling state of the vehicle 9 (a step S256). The overwritten record and the newly added compartment data are corrected based on the moving amount of the vehicle 9 during the period between the generation time of the frames and the present time. The record not updated in the compartment list 18 is corrected based on the moving amount of the vehicle 9 during the period between a previous updating time and the present time. When the vehicle 9 moves, errors in the parking reference position S, the first starting point and the second starting point increase. By correcting the parking position S, the first starting point and the second starting point recorded in the compartment list 18, the list manager 213 suppresses the errors. The list manager 213 outputs the corrected compartment list 18 to the vehicle controller 2.

When executing the step S256, the list manager 213 deletes the record having the parking reference position S a predetermined distance away from the origin Ow. This is because there is a low possibility that the vehicle 9 is parked in the parking compartment L in a position away from the vehicle 9.

A reason why the reliability recorded in the compartment list 18 is decreased in the step S251 will be described. When the record in the compartment list 18 is not overwritten, a process of multiplying the reliability of this record by the coefficient smaller than 1 is repeated. As a result, the reliability of the record that is not overwritten becomes closer to 0.

Since the previously detected parking compartment L can be prevented from being continuously recorded in the compartment list, the accuracy of the parking compartment L can be improved.

[3.4. Specifying Detection Area (Step S15)]

(Simple Mode)

The detection setter 12 informs the detection area specifying part 14 of the frame that is processed by the first detector 21 and the detection mode of the first detector 21. The detection area specifying part 14 specifies the detection area of the frame that is processed by the first detector 21 based on the information from the detection setter 12 (the step S15 shown in FIG. 9). The detection area specifying part 14 similarly specifies the detection area of the frame that is processed by the second detector 22.

Specifying the detection area in the simple mode will be hereinafter described by taking a case in which the first detector 21 detects the parking compartment L from the left side frame 31L in the simple mode as an example. The same thing applies to the specifying of the detection area in a case where the detection mode of the second detector 22 is the simple mode.

The area table 32 previously records the detection area in the simple mode to be set for the frames generated by each of the cameras 3. The detection area in the simple mode is different depending on the camera to be assigned to the first detector 21. This is because an imaging area captured by each camera is different depending on the installation position and an optical axis direction of each camera.

When the left side camera 3L is assigned to the first detector 21, the detection area specifying part 14 acquires the detection area in the simple mode associated with the left side camera 3L from the area table 32, and specifies the acquired detection area as the detection area of the left side frame 31L. The detection area specifying part 14 informs the border-line detector 211 of the specified detection area of the left side frame 31L. The border-line detector 211 selects the attention pixel from the pixels within the informed detection area (the step S201 shown in FIG. 13).

As a result, as shown in FIG. 7, the detection area 31K in the simple mode is specified in the left side frame L. In an example shown in FIG. 7, an area in which the vehicle body of the vehicle 9 does not appear in the left side frame 31L is specified as the detection area. Thus, it is possible to reduce the load on the first detector 21 that detects the parking compartment L. The detection area specifying part 14 may specify an area in which a road surface is assumed to appear in the left side frame 31L as the detection area.

The detection area specified in the simple mode is specified in the image coordinate system. Therefore, the detection area specifying part 14 outputs the detection area acquired from the area table 32 to the first detector 21 as it is.

(Detailed Mode)

An operation of the detection area specifying part 14 will be described by taking a case in which the detailed mode is set as the detection mode of the first detector 21 as an example. It is assumed that the detection setter 12 assigns the left side camera 3L to the first detector 21.

Figure 18:
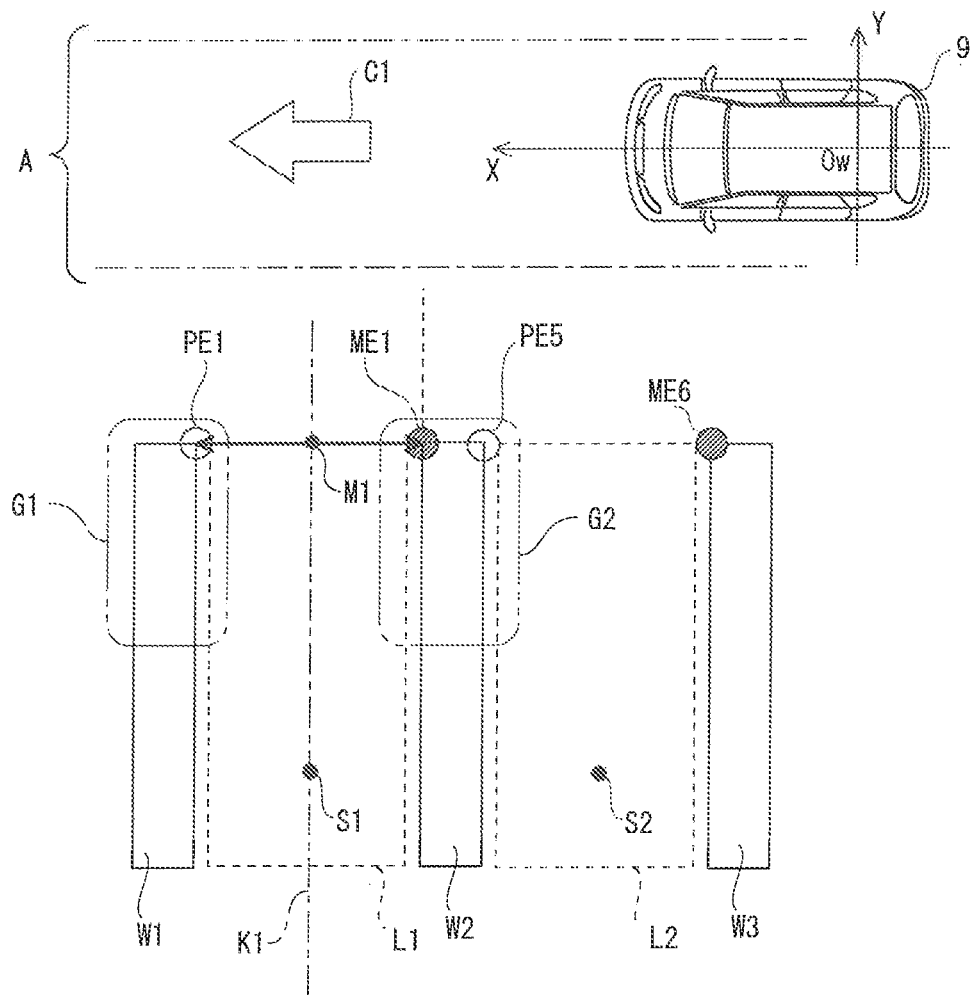
FIG. 18 illustrates the detection areas based on a detailed mode that is specified by a detection area specifying part.

In this case, the detection area specifying part 14 specifies the detection area based on the parking reference position S of the parking compartment L recorded in the compartment list 18 and positions of the first starting point and the second starting point. FIG. 18 illustrates a method of setting the detection area in the detailed mode.

For example, when the parking compartment L1 is registered in the compartment list 18, the detection area specifying part 14 sets two detection areas G1 and G2 based on the parking reference position S1 of the parking compartment L1 and positions of the first starting point and the second starting point. Specifically, the detection area specifying part 14 identifies the midpoint M1 connecting the starting point PE1 and the starting point ME1. The detection area specifying part 14 identifies a straight line connecting the identified midpoint M1 and the parking reference position S1 as the center line K1.

The detection area specifying part 14 sets a rectangular detection area G1 that includes the starting point PE1 of the edge line and has a long side extending in a direction in which the center line K1 extends. The detection area specifying part 14 sets a rectangular detection area G2 that includes the starting point ME1 of the edge line and has a long line extending in a direction in which the center line K1 extends. As a result, the two detection areas G1 and G2 based on the parking compartment L1 are set.

Lengths of short sides of the detection areas G1 and G2 are set based on a general width of the white line W. The lengths of the long sides of the detection areas G1 and G2 are set to be, for example, 1.5 m. That is, the detection area to be set in the detailed mode does not include the entire white line W. Since the parking compartment L is identified based on the parking reference position S and the starting point of the border line B that constitute the outline of the white line W, the entire white line W does not have to be detected. As a result, an area of the detection area in the detailed mode can be decreased. Even when all the pixels of the detection area are selected as the attention pixels, the parking compartment L can be immediately detected.

Although not shown in FIG. 18, the detection area specifying part 14 specifies the detection area corresponding to the parking compartment L2. Specifically, the detection area corresponding to the parking compartment L2 is determined based on the parking reference position S of the parking compartment L2, and positions of two starting points (the positive edge point PE5 and the negative edge point ME6). As a result, the detection area G2 overlaps with the detection area corresponding to the parking compartment L2. This is because the negative edge point ME1 and the positive edge point PE5 are vertices of the same white line. In this case, the detection area specifying part 14 informs the first detector 21 of a sum area of the two detection areas G1 and G2.

The detection area specified in the detailed mode is described in the world coordinate system. Thus, the detection area specifying part 14 transforms the coordinate system of the specified detection area from the world coordinate system to the image coordinate system of the left side frame 31L. The detection area specifying part 14 outputs the detection area transformed into the image coordinate system to the first detector 21.

In an example shown in FIG. 8, a hatching area 31N is the detection area that is specified in the detailed mode. The hatching area 31N is set so as to include the end point closer to the vehicle 9 among the end points of the white line. The detection area that is specified in the detailed mode is narrower than the detection area that is specified in the simple mode. In the detailed mode, a number of the pixels included in the detection area is smaller than in the simple mode. When the detailed mode is set, all the pixels included in the detection area are set to the attention pixels. Thus, the detection accuracy of the parking compartment L can be improved.

[4. First Example of Traveling State of Vehicle 9]

Figure 19:
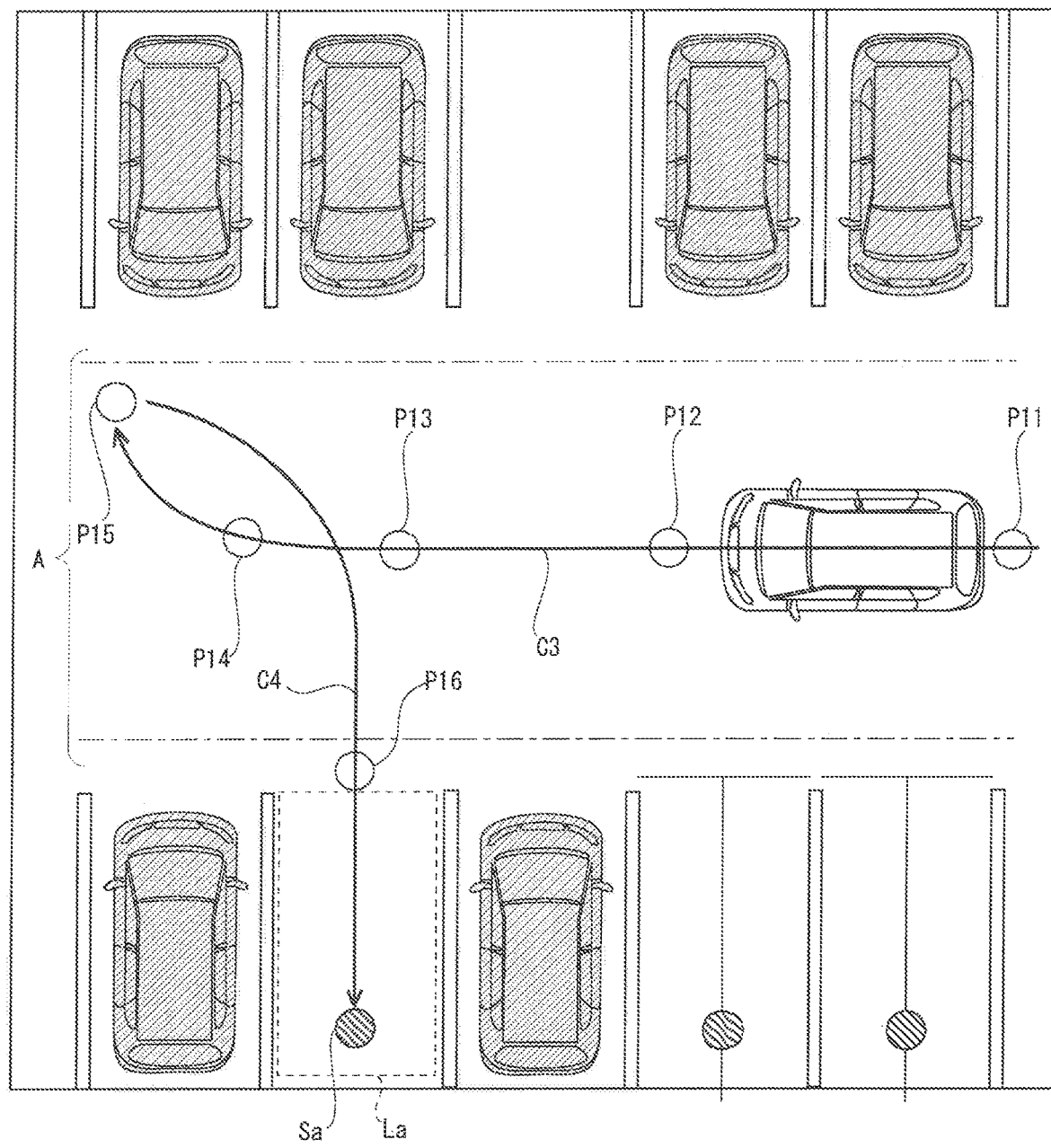
FIG. 19 illustrates one example of a parking route of a vehicle shown in FIG. 2.

FIG. 19 illustrates a first example of a parking route of the vehicle 9 shown in FIG. 2. With reference to FIG. 19, the vehicle 9 is parked in a parking compartment La by traveling on a route indicated by an arrow C4 after traveling on a route indicated by an arrow C3. The cameras and the detection modes that are selected according to the traveling state of the vehicle 9 will be described by taking a case in which the vehicle 9 is parked in the parking compartment La as an example.

[4.1. Case in which Vehicle 9 is Traveling Straight at Normal Speed]

It is assumed that the vehicle 9 is traveling straight while decelerating in a section between a position P11 and a position P12 as shown in FIG. 19. Specifically, the speed of the vehicle 9 is 15 km/h at the position P11 and 8 km/h at the position P12. The rotation angle of the steering wheel of the vehicle 9 is 00 in the section between the position P11 and the position P12. In this case, the parking compartment recognition apparatus 1 starts the process shown in FIG. 9 at the position P11.

(Selection of Camera)

Since the vehicle 9 is traveling straight at a speed of 8 km/h or more, the traveling state of the vehicle 9 corresponds to the mode ID "1" in the setting table 19 shown in FIG. 10. Therefore, the detection setter 12 selects the left side camera 3L and the right side camera 3R (the step S13 shown in FIG. 9). The left side camera 3L is assigned to the first detector 21.

The right side camera 3R is assigned to the second detector 22.

(Determination of Detection Mode)

Since the traveling state of the vehicle 9 corresponds to the mode ID "1", the detection setter 12 sets the detection mode of each of the first detector 21 and the second detector 22 to the simple mode (the step S14 shown in FIG. 9).

The detection setter 12 informs the image acquisition part 11 of the cameras selected in the step S13. The image acquisition part 11 outputs the frames generated by the cameras selected in the step S13 to the first detector 21 and the second detector 22 based on the information from the detection setter 12. The frames are output at regular intervals. The regular intervals are determined based on processing speeds of the first detector 21 and the second detector 22 and are, for example, 0.3 seconds.

Since the detection modes of the first detector 21 and the second detector 22 are the simple mode, the detection area specifying part 14 specifies the detection areas of the left side frame 31L and the right side frame 31R based on the area table 32 stored in the memory 17 (the step S15).

The first detector 21 and the second detector 22 detect the parking compartment L from the detection areas of the left side frame 31L and the right side frame 31R (the step S16). The compartment list 18 is updated based on the parking compartment L detected based on the step S16 (the step S17).

When the vehicle 9 is traveling straight at a speed of 8 km/h or more, the parking compartment recognition apparatus 1 repeats a process for detecting the parking compartment L by using left and right cameras.

When the vehicle 9 is traveling straight at a speed of 8 km/h or more, there is a low possibility that the vehicle 9 immediately stops to perform the backward parking. In this case, the parking compartment recognition apparatus 1 selects the left side camera 3L that captures a left-side wide area of the vehicle 9 and the right side camera 3R that captures a right-side wide area of the vehicle 9 in order to detect as many parking compartments L as possible.

The simple mode is set as the detection modes of the first detector 21 and the second detector 22. In the simple mode, since previous detection results of the parking compartment L are not used, a new parking compartment L can be detected. Therefore, many parking compartments L can be detected.

[4.2. Case in which Vehicle 9 is Traveling Straight at Intermediate Speed]

It is assumed that the vehicle 9 is traveling straight at a speed of 4 to 8 km/h in a section between the position P12 and a position P13 as shown in FIG. 19. In this case, the rotation angle of the steering wheel is 0°.

The detection setter 12 determines that the traveling state in the section between the position P12 and the position P13 corresponds to a mode ID "3" in the setting table 19 shown in FIG. 10. As a result, the detection setter 12 assigns the left side camera 3L and the right side camera 3R to the first detector 21, and assigns the rear camera 3B to the second detector 22 (the step S13). The first detector 21 alternately repeats the process for detecting the parking compartment L from the left side frame 31L and the process for detecting the parking compartment L from the right side frame 31R. As described above, by assigning two or more cameras to the first detector 21, it is possible to select the cameras more in number than the detectors included in the parking compartment detector 15.

The detection setter 12 sets the detection modes of the first detector 21 and the second detector 22 to the simple mode based on the traveling state in the section between the position P12 and the position P13 (the step S14).

The detection area specifying part 14 specifies the detection areas of the frames generated by the cameras assigned to each of the first detector 21 and the second detector 22 (the step S15). Specifically, the detection area specifying part 14 determines the detection area of each of the left side frame 31L and the right side frame 31R in a case where the simple mode is set, and informs the first detector 21 of the determined two detection areas. The detection area specifying part 14 determines the detection area of the rear frame 31B in a case where the simple mode is set, and informs the second detector 22 of the determined detection area.

The first detector 21 detects the parking compartment L from the detection areas of the left side frame 31L and the right side frame 31R (the step S16). That is, the first detector 21 repeats the process for detecting the parking compartment L from the left side frame 31L and the process for detecting the parking compartment L from the right side frame 31R. The second detector 22 detects the parking compartment L from the detection area of the rear frame 31B (the step S16). The compartment list 18 is updated based on the parking compartment L detected based on the step S16 (the step S17).

When the vehicle 9 is traveling straight at a speed of 4 to 8 km/h, it is supposed that the vehicle 9 is decelerating near the vacant parking compartment L. As a result, the parking compartment recognition apparatus 1 detects the parking compartment L by using not only the left side camera 3L and the right side camera 3R but also the rear camera 3B, assuming that the backward parking is performed.

[4.3. Case in which Vehicle 9 Turns Right at Intermediate Speed]

It is assumed that the vehicle 9 is turning right at a speed of 4 to 8 km/h in a section between the position P13 and a position P14 as shown in FIG. 19. In this case, the rotation angle of the steering wheel is 2500.

The detection setter 12 determines that the traveling state in the section between the position P13 and the position P14 corresponds to a mode ID "4" in the setting table 19 shown in FIG. 10. As a result, the detection setter 12 assigns the left side camera 3L to the first detector 21 and assigns the rear camera 3B to the second detector 22 (the step S13). The detection setter 12 sets the detection modes of the first detector 21 and the second detector 22 to the simple mode (the step S14).

The detection area specifying part 14 specifies the detection areas of the frames generated by the cameras assigned to each of the first detector 21 and the second detector 22 (the step S15). Specifically, the detection area specifying part 14 determines the detection area of each of the left side frame 31L and the rear frame 31B in a case where the simple mode is set based on the area table 32. The detection area specifying part 14 informs the first detector 21 of the detection area of the left side frame 31L, and informs the second detector 22 of the detection area of the rear frame 31B.

The first detector 21 detects the parking compartment L from the detection area of the left side frame 31L (the step S16). The second detector 22 detects the parking compartment L from the detection area of the rear frame 31B (the step S16). The compartment list 18 is updated based on the parking compartment L detected based on the step S16 (the step S17).

When the vehicle 9 is turning right at a speed of 4 to 8 km/h, it is supposed that the driver of the vehicle 9 intends to park the vehicle 9 in the parking compartment L located on the left rear side of the vehicle 9. According to the above idea, the parking compartment recognition apparatus 1 selects the left side camera 3L that captures an image of the outside area of the turning track of the vehicle 9 and the rear camera 3B that captures the rear view of the vehicle 9. The first detector 21 does not execute the process for detecting the parking compartment L from the right side frame 31R, different from when the vehicle 9 is traveling in the section between the position P12 and the position P13. Therefore, it is possible to continuously detect the parking compartment in which the vehicle 9 is most likely to be parked.

[4.4. Case in which Vehicle 9 Turns Right at Speed Just Before Stopping]

It is assumed that the vehicle 9 turns right at a speed of 4 km/h or less in a section between the position P14 and a position P15 as shown in FIG. 19, and stops at the position P15. The rotation angle of the steering wheel is 250°. An operation of the parking compartment recognition apparatus 1 in a case where the vehicle 9 is traveling in the section between the position P14 and the position P15 will be described.

The detection setter 12 determines that the traveling state in the section between the position P14 and the position P15 corresponds to a mode ID "7" in the setting table 19 shown in FIG. 10. As a result, the detection setter 12 assigns the left side camera 3L to the first detector 21 and assigns the rear camera 3B to the second detector 22 (the step S13). The detection setter 12 sets the detection mode of the first detector 21 to the simple mode and sets the detection mode of the second detector 22 to the simple mode and the detailed mode (the step S14).

The detection area specifying part 14 specifies the detection areas of the frames generated by the cameras assigned to each of the first detector 21 and the second detector 22 (the step S15). Specifically, since the detection mode of the first detector 21 is the simple mode, the detection area specifying part 14 determines the detection area of the left side frame 31L based on the area table 32. The detection mode of the second detector 22 is the simple mode and the detailed mode. The detection area specifying part 14 first determines the detection area of the rear frame 31B based on the area table 32.

The first detector 21 detects the parking compartment L from the left side frame 31L (the step S16). The second detector 22 detects the parking compartment L from the detection area of the rear frame 31B (the step S16). The compartment list 18 is updated based on the parking compartment L detected based on the step S15 (the step S17).

The detection area specifying part 14 determines the detection area of the rear frame 31B based on the updated compartment list 18. That is, the detection area specifying part 14 determines the detection area of the rear frame 31B in the detailed mode. The second detector 22 detects the parking compartment L from the rear frame 31B in the detailed mode (the step S16). Then, the second detector 22 alternately repeats the simple mode and the detailed mode. On the other hand, the first detector 21 repeatedly executes the detection of the parking compartment L in the simple mode.

When the vehicle 9 is turning right at a speed of 4 km/h or less, it is supposed that the driver of the vehicle 9 immediately stops the vehicle 9 to turn the vehicle 9. The parking compartment La is located on the left rear side of the vehicle 9 and the backward parking is soon started. Thus, the parking compartment recognition apparatus 1 executes the process for detecting the parking compartment L from the rear frame 31B in the detailed mode in addition to the process for detecting the parking compartment L from the left side frame 31L and the rear frame 31B in the simple mode. As a result, the parking compartment recognition apparatus 1 can detect the parking compartment La with a high accuracy while detecting a wide range of the parking compartments L.

[4.5. Case in which Vehicle 9 is Moving Backward Outside Parking Compartment L]

When the parking instruction switch 6 is pressed after the vehicle 9 stops at the position P15, the vehicle controller 2 instructs the driver to select the parking compartment L. When the driver selects the parking compartment La, the vehicle controller 2 starts the parking assistance. Specifically, the vehicle controller 2 rotates the steering wheel to steer the vehicle 9. The driver operates a gas pedal or a brake pedal of the vehicle 9.

It is assumed that the vehicle 9 is moving backward outside the parking compartment L. Specifically, the vehicle 9 is moving backward in a section between the position P15 and a position P16 as shown in FIG. 19. The section between the position P15 and the position P16 is outside the parking compartment La. The parking compartment recognition apparatus 1 determines whether or not the origin Ow exists in the parking compartment La based on a parking reference position Sa of the parking compartment La, positions of the first starting point and the second starting point. For example, when the origin Ow does not cross a line segment connecting the first starting point and the second starting point of the parking compartment La, the parking compartment recognition apparatus 1 determines that the vehicle 9 exists outside the parking compartment La.

The detection setter 12 determines that the traveling state in the section between the position P15 and the position P16 corresponds to a mode ID "8" in the setting table 19 shown in FIG. 10. Therefore, the detection setter 12 selects only the rear camera 3B. That is, the first detector 21 and the second detector 22 detect the parking compartment L from the rear frame 31B. The detection setter 12 sets the detection mode of the first detector 21 to the simple mode and sets the detection mode of the second detector 22 to the detailed mode (the step S13).

The detection area specifying part 14 specifies the detection areas of the frames generated by the cameras assigned to each of the first detector 21 and the second detector 22 (the step S15). Specifically, since the detection mode of the first detector 21 is the simple mode, the detection area specifying part 14 determines the detection area of the rear frame 31B based on the area table 32. Since the detection mode of the second detector 22 is the detailed mode, the detection area specifying part 14 determines the detection area of the rear frame 31B based on the compartment list 18.

Since the backward parking is started, the parking compartment La to park the vehicle 9 is located on a rear side of the vehicle 9. As a result, by executing the process for detecting the parking compartment L from the rear frame 31B in both the simple mode and the detailed mode, the parking compartment recognition apparatus 1 can detect the parking compartment La located on the rear side of the vehicle 9 with a high accuracy and prevent detection omission of the parking compartment La located on the rear side of the vehicle 9.

[4.6. Case in which Vehicle 9 is Moving Backward within Parking Compartment L]

It is assumed that the vehicle 9 is moving backward in the parking compartment L. Specifically, with reference to FIG. 19, the vehicle 9 is moving backward in a section between the position P16 and the parking reference position Sa of the parking compartment La. The section between the position P16 and the parking reference position Sa is within the parking compartment La.

The detection setter 12 determines that the traveling state in the section between the position P16 and the parking reference position Sa corresponds to a mode ID "9" in the setting table 19 shown in FIG. 10. Therefore, the detection setter 12 selects the left side camera 3L and the right side camera 3R (the step S13). The detection setter 12 sets the detection modes of both the first detector 21 and the second detector 22 to the detailed mode (the step S14).

The detection area specifying part 14 specifies the detection areas of the frames generated by the cameras assigned to each of the first detector 21 and the second detector 22 (the step S15). Specifically, since the detection modes of the first detector 21 and the second detector 22 are the detailed mode, the detection areas of the left side frame 31L and the right side frame 31R are determined based on the compartment list 18. At this time, it is desirable that the detection area specifying part 14 sets a length of a long side of the detection area to be greater than a length of the parking compartment in a general vehicle length direction. The entire white line within the left side frame 31L can be included in the detection area. The detection area of the right side frame 31R is also set similarly.

The first detector 21 detects the parking compartment L from the detection area of the left side frame 31L (the step S16). The second detector 22 detects the parking compartment L from the detection area of the rear frame 31B (the step S16). The compartment list 18 is updated based on the parking compartment L detected based on the step S16 (the step S17).

When the vehicle 9 is moving backward within the parking compartment La, the left side camera 3L and the right side camera 3R can capture an image of the entire white line that specifies the parking compartment La. Even when the parking compartment recognition apparatus 1 uses the detailed mode, the parking compartment recognition apparatus 1 can detect the entire white line that specifies the parking compartment La and detect the parking reference position Sa of the parking compartment La.

When the vehicle 9 is moving backward within the parking compartment La, one of the two border lines of the parking compartment La extending in a long-side direction is captured by the left side camera 3L and the other is captured by the right side camera 3R. In this case, the parking compartment detector 15 may determine the parking reference position Sa of the parking compartment La based on the edge line detected from the left side frame 31L and the edge line detected from the right side frame 31R.

[5. Second Example of Traveling State of Vehicle 9]

Figure 20:
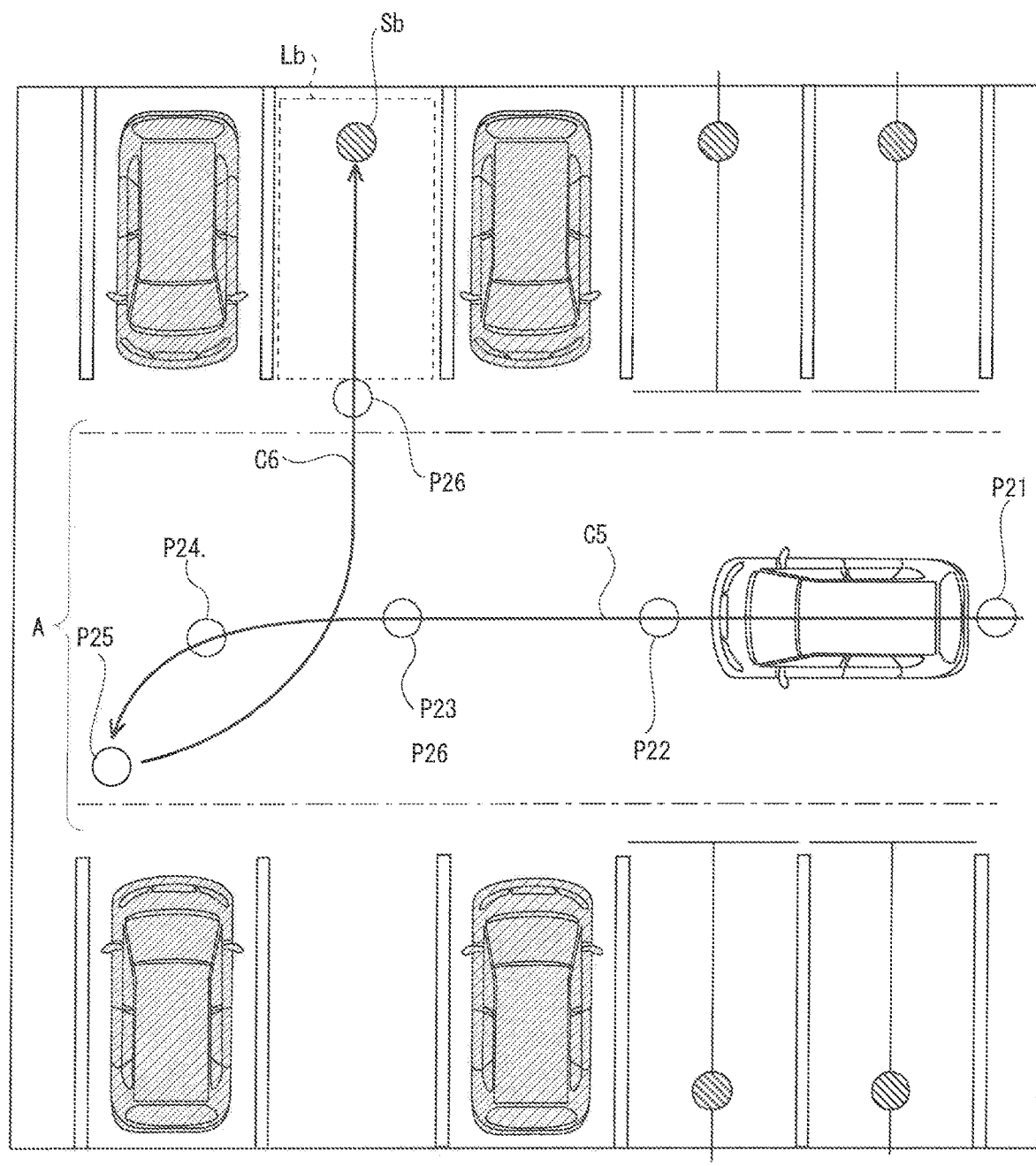
FIG. 20 illustrates another example of the parking route of the vehicle shown in FIG. 2.

FIG. 20 illustrates a second example of the parking route of the vehicle 9 shown in FIG. 2. With reference to FIG. 20, the vehicle 9 is parked in a parking compartment Lb by traveling on a route indicated by an arrow C6 after traveling on a route indicated by an arrow C5. The cameras and the detection modes that are selected according to the traveling state of the vehicle 9 will be described by taking a case in which the vehicle 9 is parked in the parking compartment Lb as an example.

[5.1. Case in which Vehicle 9 Travels Straight at Normal Speed]

It is assumed that the vehicle 9 is traveling straight while decelerating at a speed of 8 to 15 km/h in a section between a position P21 and a position P22 as shown in FIG. 20. The rotation angle of the steering wheel of the vehicle 9 is 00. The traveling state of the vehicle 9 corresponds to the mode ID "1" shown in FIG. 10. The parking compartment recognition apparatus 1 operates in the same way as when the vehicle 9 moves from the position P11 to the position P12 as shown in FIG. 19.

[5.2. Case in which Vehicle 9 Travels Straight at Intermediate Speed]

It is assumed that the vehicle 9 is traveling straight at a speed of 4 to 8 km/h in a section between the position P22 and a position P23 as shown in FIG. 20. The rotation angle of the steering wheel is 0°. The traveling state of the vehicle 9 corresponds to the mode ID "3" shown in FIG. 10. The parking compartment recognition apparatus 1 operates in the same way as when the vehicle 9 moves from the position P12 to the position P13 as shown in FIG. 19.

[5.3. Case in which Vehicle 9 Travels at Speed Just Before Stopping]

It is assumed that the vehicle 9 is traveling straight at a speed of 4 km/h or less in a section between the position P22 and the position P23 as shown in FIG. 20. The rotation angle of the steering wheel is 0°. The traveling state of the vehicle 9 corresponds to a mode ID "6" shown in FIG. 10. The detection setter 12 assigns the left side camera 3L and the right side camera 3R to the first detector 21 and assigns the rear camera 3B to the second detector 22 (the step S13). The detection setter 12 sets the detection mode of the first detector 21 to the simple mode and sets the detection mode of the second detector 22 to the simple mode and the detailed mode (the step S14).

The detection area specifying part 14 specifies the detection areas of the frames generated by the cameras assigned to each of the first detector 21 and the second detector 22 (the step S15). Specifically, the detection area specifying part 14 determines the detection area of each of the left side frame 31L and the right side frame 31R in the simple mode. The detection area specifying part 14 determines the detection area of the rear frame 31B in the simple mode and the detection area of the rear frame 31B in the detailed mode.

When executing the step S16, the first detector 21 alternately repeats the process for detecting the parking compartment L from the left side frame 31L and the process for detecting the parking compartment L from the right side frame 31R. When executing the step S16, the second detector 22 alternately repeats the process for detecting the parking compartment L in the simple mode and the process for detecting the parking compartment L in the detailed mode. The list manager 213 updates the compartment list 18 based on the parking compartments L detected by the first detector 21 and the second detector 22 (the step S17).

When the vehicle 9 travels straight at a speed just before stopping, the parking compartment recognition apparatus 1 assigns the left side camera 3L and the right side camera 3R to the first detector 21. This is because the parking compartment recognition apparatus 1 cannot identify whether the vehicle 9 parks in a right rear direction or a left rear direction although the vehicle 9 is in a state just before starting to perform the backward parking. After the parking compartment recognition apparatus 1 assigns the rear camera 3B to the second detector 22, the parking compartment recognition apparatus 1 sets the detection mode of the second detector 22 to the simple mode and the detailed mode. As result, the parking compartment recognition apparatus 1 can detect a wide range of parking compartments and improve the detection accuracy of the parking compartments located on the rear side of the vehicle 9.

[5.4. Case in which Vehicle 9 Turns Left at Intermediate Speed]

It is assumed that the vehicle 9 turns left at a speed of 4 to 8 km/h in a section between the position P23 and a position P24 as shown in FIG. 20. The rotation angle of the steering wheel is 250°. The traveling state of the vehicle 9 corresponds to a mode ID "2" in the setting table 19 shown in FIG. 10.

The detection setter 12 assigns the right side camera 3R to the first detector 21 and assigns the rear camera 3B to the second detector 22 (the step S113). The detection setter 12 sets the detection modes of the first detector 21 and the second detector 22 to the simple mode (the step S14). The detection area specifying part 14 determines the detection area of each of the left side frame 31L and the rear frame 31B in a case where the simple mode is set based on the area table 32 (the step S15).

The first detector 21 detects the parking compartment L from the detection area of the left side frame 31L (the step S16). The second detector 22 detects the parking compartment L from the detection area of the rear frame 31B (the step S16). The compartment list 18 is updated based on the parking compartment L detected based on the step S16 (the step S17).

When the vehicle 9 turns left at a speed of 4 to 8 km/h, it is supposed that the driver of the vehicle 9 intends to park the vehicle 9 in the parking compartment L located on the right rear side of the vehicle 9. According to the above idea, the parking compartment recognition apparatus 1 selects the right side camera 3R that captures an image of the outside area of the turning track of the vehicle 9 and the rear camera 3B that captures the rear view of the vehicle 9. As a result, it is possible to continuously detect the parking compartment in which the vehicle 9 is most likely to be parked.

[5.5. Case in which Vehicle 9 Turns Left at Speed Just Before Stopping]

It is assumed that the vehicle 9 turns left at a speed of 4 km/h or less in a section between the position P24 and a position P25 as shown in FIG. 20, and stops at the position P25. The rotation angle of the steering wheel is 250°. In this case, the traveling state of the vehicle 9 corresponds to a mode ID "5" in the setting table 19 shown in FIG. 10.

The detection setter 12 assigns the right side camera 3R to the first detector 21 and assigns the rear camera 3B to the second detector 22 (the step S13). The detection setter 12 sets the detection mode of the first detector 21 to the simple mode and sets the detection mode of the second detector 22 to the simple mode and the detailed mode (the step S14).

Since the detection mode of the first detector 21 is the simple mode, the detection area specifying part 14 determines the detection area of the left side frame 31L based on the area table 32 (the step S15). The detection area specifying part 14 first determines the detection area of the rear frame 31B based on the area table 32 (the step S15).

The first detector 21 detects the parking compartment L from the detection area of the left side frame 31L (the step S16). The second detector 22 detects the parking compartment L from the detection area of the rear frame 31B (the step S16). The compartment list 18 is updated based on the parking compartment L detected based on the step S15 (the step S17).

The detection area specifying part 14 determines the detection area of the rear frame 31B based on the updated compartment list 18 (the step S15). This is because the second detector 22 alternately repeats the simple mode and the detailed mode. The second detector 22 detects the parking compartment L from the detection area of the rear frame 31B in the detailed mode (the step S16).

When the vehicle 9 turns left at a speed of 4 km/h or less, it is supposed that the driver immediately stops the vehicle 9 to turn the vehicle 9. This is because the vehicle 9 is parked in the parking compartment Lb located on the right rear side of the vehicle 9. The parking compartment recognition apparatus 1 executes the process for detecting the parking compartment L from the rear frame 31B in the detailed mode in addition to the process for detecting the parking compartment L from the left side frame 31L and the rear frame 31B in the simple mode. As a result, the parking compartment recognition apparatus 1 can detect the parking compartment Lb with a high accuracy while detecting a wide range of the parking compartments L.

[5.6. Case in which Vehicle 9 is Moving Backward Outside Parking Compartment L]

After the vehicle 9 stops at the position P25 shown in FIG. 20, the driver presses the parking instruction switch 6. The vehicle controller 2 instructs the driver to select the parking compartment L according to pressing of the parking instruction switch 6. When the driver selects the parking compartment Lb, the vehicle controller 2 starts the parking assistance. Specifically, the vehicle controller 2 rotates the steering wheel to steer the vehicle 9. The driver operates the gas pedal or the brake pedal of the vehicle 9. The parking compartment recognition apparatus 1 operates in a section between the position P25 and a position P26 in the same way as when the vehicle 9 moves from the position P15 to the position P16 as shown in FIG. 19.

[5.7. Case in which Vehicle 9 is Moving Backward within Parking Compartment L]

It is assumed that the vehicle 9 is moving backward within the parking compartment Lb shown in FIG. 20. Specifically, the vehicle 9 is moving backward in a section between the position P26 and a parking reference position Sb of the parking compartment Lb. The section between the position P26 and the parking reference position Sa is within the parking compartment Lb. The parking compartment recognition apparatus 1 operates in the section between the position P26 and the parking reference position Sb in the same way as when the vehicle moves from the position P26 to the parking reference position Sb as shown in FIG. 19.

SUMMARY

As described above, the parking compartment recognition apparatus 1 selects the cameras to be used for detecting the parking compartment L from among a plurality of cameras 3 based on the traveling state of the vehicle 9. As a result, the parking compartment recognition apparatus 1 can reduce a load for detecting the parking compartment L. The parking compartment recognition apparatus 1 changes the processing contents of detecting the parking compartment L based on the traveling state of the vehicle 9. As a result, the parking compartment recognition apparatus 1 can reduce the load for detecting the parking compartment L without lowering the detection accuracy of the parking compartment L.

Modification (Case in which a Parking Compartment is Separated by U-Shaped White Lines)

In the above embodiment, a case in which the parking compartments L are separated by one white line has been described. However, a parking compartment recognition apparatus 1 may detect a parking compartment L set by U-shaped white lines.

Figure 21:
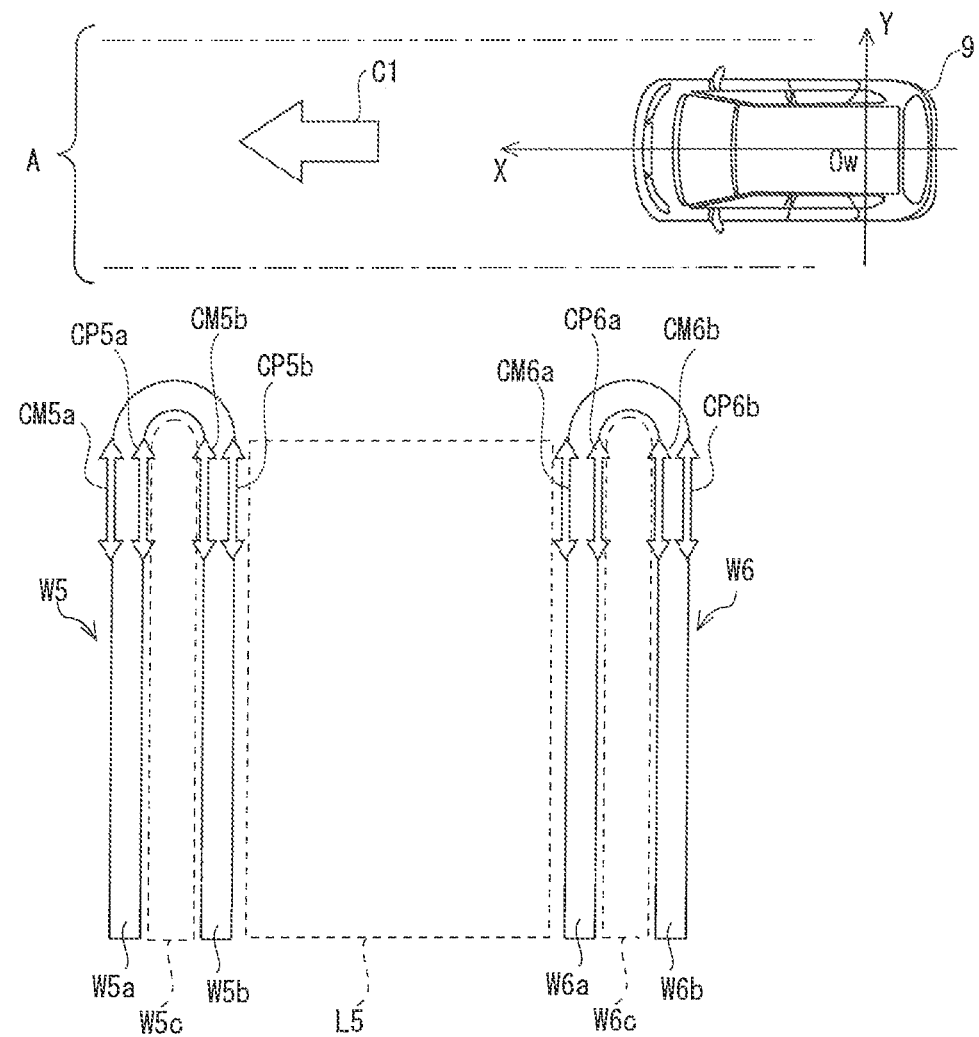
FIG. 21 illustrates a modification of one of the parking compartment shown in FIG. 3.

FIG. 21 illustrates detection of the parking compartment L set by U-shaped white lines. In FIG. 21, a size of each of the white lines is exaggeratingly shown in an enlarged manner. With reference to FIG. 21, a parking compartment L5 is separated by a white line W5 and a white line W6, each having a U-shape.

The white line W5 includes a white line W5a and a white line W5b. The white line W5a is parallel to the white line W5b. A dark region W5c is a region between the white line W5a and the white line W5b, in which asphalt is exposed. The white line W6 includes a white line W6a and a white line W6b. The white line W6a is parallel to the white line W6b. A dark region W6c is a region between the white line W6a and the white line W6b, in which asphalt is exposed.

A border-line detector 211, as described above, detects positive edge lines CP5a, CP5b, CP6a and CP6b and detects negative edge lines CM5a, CM5b, CM6a and CM6b. The positive edge line CP5a and the negative edge line CM5a form a part of an outline of the white line W5a. The positive edge line CP5b and the negative edge line CM5b form a part of an outline of the white line W5b. The positive edge line CP6a and the negative edge line CM6a form a part of an outline of the white line W6a. The positive edge line CP6b and the negative edge line CM6b form a part of an outline of the white line W6b.

A compartment determiner 212 generates a pair in the above described method, and calculates a distance between two edge lines constituting the generated pair. Specifically, the compartment determiner 212 identifies the positive edge line CP5a and the negative edge line CM5b as a candidate pair. A region between the positive edge line CP5a and the negative edge line CM5b is the dark region W5c.

However, a width of the dark region W5c is much smaller than a width of the parking compartment L5. Thus, a distance between the positive edge line CP5a and the negative edge line CM5b is outside a predetermined range corresponding to a width of the parking compartment. Therefore, the compartment determiner 212 does not detect the dark region W5c as the parking compartment L. Similarly, the dark region W6c of the white line W6 is not detected as the parking compartment L.

The compartment determiner 212 generates a pair including the positive edge line CP5b and the negative edge line CM6a and determines that a distance between two edge lines constituting this pair is within the predetermined range corresponding to the width of the parking compartment. That is, the compartment determiner 212 detects the parking compartment L5 based on the positive edge line CP5b and the negative edge line CM6a.

(Case in which Parking Compartment is Oblique to Traveling Road)

Figure 22:
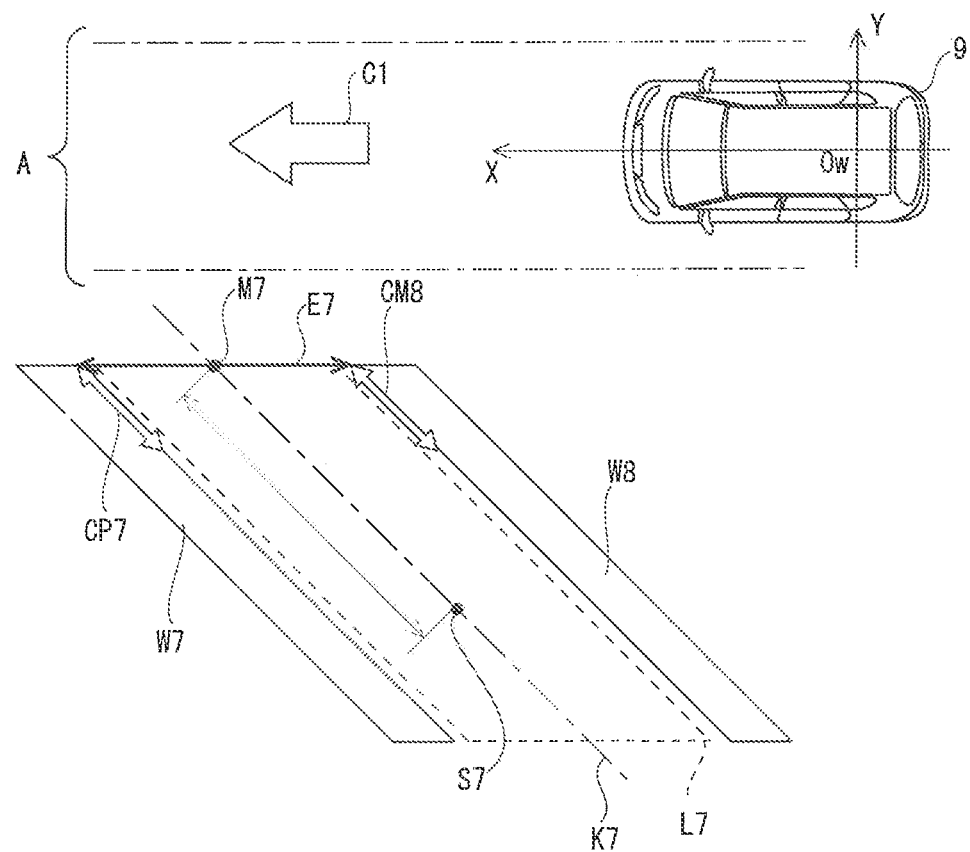
FIG. 22 illustrates another modification of the parking compartment shown in FIG. 3.

FIG. 22 illustrates detection of the parking compartment L obliquely set to a traveling road A. In FIG. 22, a size of each of the white lines is exaggeratingly shown in an enlarged manner. With reference to FIG. 22, a parking compartment L7 is set by white lines W7 and W8. An angle that is formed by the traveling road A and the parking compartment L7 is, for example, 45°. That is, the parking compartment L7 is a parallelogram. Even when the parking compartment L7 is obliquely set to the traveling road A, a parking compartment detector 15 can detect the parking compartment L7 in the above described method. Description will be hereinafter described in detail.

The compartment determiner 212 detects the parking compartment L7 based on a positive edge line CP7 and a negative edge line CM8 by using the above same method.

The compartment determiner 212 determines a parking reference position S7 of the parking compartment L7. Specifically, the compartment determiner 212 identifies a line segment E7 connecting a starting point of the positive edge line CP7 and a starting point of the negative edge line CM8. The compartment determiner 212 determines a linear line that passes through a midpoint M7 of the identified line segment E7 and is parallel to one of the positive edge line CP7 and the negative edge line CM8 to be the center line K7 of the parking compartment L7. The compartment determiner 212 determines a point that exists on the center line K7 located within the parking compartment L7 and exists at a position a length Lg away from the midpoint M7 to be the parking reference position S7 of the parking compartment L7.

Figure 23:
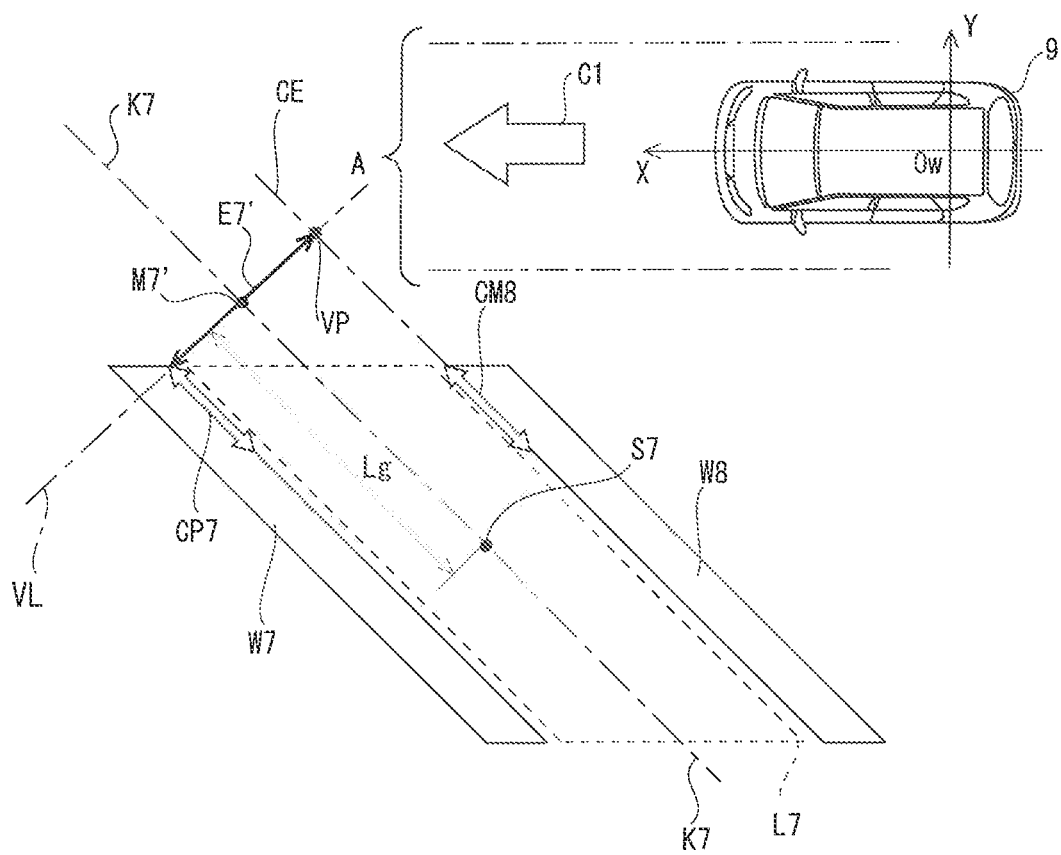
FIG. 23 illustrates another determination method of a parking reference position.

FIG. 23 illustrates another determination method of a parking reference position in the parking compartment L7. In FIG. 23, a size of each of the white lines is exaggeratingly shown in an enlarged manner. The compartment determiner 212 generates a linear line VL that is orthogonal to an extended line CE obtained by extending the negative edge line CM8 and passes through the starting point of the positive edge line CP7. A virtual starting point VP is an intersection between the linear line VL and the extended line CE. The compartment determiner 212 identifies a midpoint M7' of a line segment E7' connecting the virtual starting point VP and the starting point of the positive edge line CP7.

The compartment determiner 212 generates the center line K7 that passes through a midpoint M7' and is parallel to one of the positive edge line CP7 and the negative edge line CM8. The compartment determiner 212 determines a point that exists on the center line K7 located within the parking compartment L7 and exists at a position a length Lg away from the midpoint M7' to be the parking reference position S7 of the parking compartment L7.

When identifying the midpoint M7', the compartment determiner 212 may generate a line that passes through the starting point of the negative edge line CM8 and is orthogonal to the negative edge line CM8 as the linear line VL. In this case, the midpoint M7' exists within the parking compartment L7.

Other Modification

In the above embodiment, a case in which the driver of the vehicle 9 performs an instruction to start parking and selection of the parking compartment L has been described. However, the invention is not limited thereto. Even when performing all parking control including the selection of a parking compartment to park the vehicle 9 and parking of the vehicle 9 to the selected parking compartment, the vehicle controller 2 may also use detection results of the parking compartment L by the parking compartment recognition apparatus 1.

In the above embodiment, a case in which the detection setter 12 acquires the rotation angle of the steering wheel as the traveling state of the vehicle 9 has been described. However, the invention is not limited thereto. The detection setter 12 may also determine whether or not the vehicle 9 turns based on a rotation angle of a steered wheel of the vehicle 9. That is, the detection setter 12 may select the cameras and determine the detection mode based on a steering angle of the vehicle 9.

In the above embodiment, a case in which the detection setter 12 selects the cameras to be used for detecting the parking compartment L and determines the detection mode based on the speed of the vehicle 9, the rotation angle of the steering wheel and the position of the vehicle 9 has been described. However, the invention is not limited thereto. The detection setter 12 may select the cameras to be used for detecting the parking compartment L and determine the detection mode based on the traveling state of the vehicle 9. For example, acceleration of the vehicle 9 may be used as the traveling state of the vehicle 9.

In the above embodiment, a case in which the detection setter 12 executes both the selection of the cameras and determination of the detection mode has been described. However, the invention is not limited thereto. The detection setter 12 may also execute either the selection of the cameras or the determination of the detection mode.

In the above embodiment, a case in which the detection setter 12 selects two cameras from four cameras 3 has been described. However, the invention is not limited thereto. The detection setter 12 may select the cameras less in number than the cameras mounted on the vehicle 9. For example, when the parking compartment detector 15 includes a third detector (not shown) besides the first detector 21 and the second detector 22, the parking compartment detector 15 can execute three processes for detecting the parking compartment from the images in parallel. In this case, the detection setter 12 may select three cameras.

In the above embodiment, a case in which the detection area specifying part 14 specifies the detection area based on the detection mode determined by the detection setter 12 has been described. However, the invention is not limited thereto. The parking compartment recognition apparatus 1 does not have to include the detection area specifying part 14. In this case, the detection area is common between the simple mode and the detailed mode.

In the above embodiment, a case in which the parking compartment recognition apparatus 1 executes both the selection of the cameras and the determination of the detection mode has been described. However, the invention is not limited thereto. The parking compartment recognition apparatus 1 may also execute either the selection of the cameras or the determination of the detection mode. When the parking compartment recognition apparatus 1 determines the detection mode and does not select the cameras, at least one camera may be mounted on the vehicle 9.

In the above embodiment, a case in which the parking compartment detector 15 does not identify a depth of the detected parking compartment L has been described. However, the invention is not limited thereto. When the parking compartment detector 15 has detected two border lines B constituting the parking compartment L, the parking compartment detector 15 may assume that the parking compartment L is quadrangular and determine four vertices specifying the parking compartment L. For example, the parking compartment detector 15 determines starting points of the two border lines B constituting the parking compartment L to be two vertices of the four vertices constituting a quadrangle. The parking compartment detector 15 determines two points a predetermined distance away from each of the starting points of the two border lines B to be remaining vertices of the four vertices. In this case, the parking compartment detector 15 may record the four vertices specifying the parking compartment L in the compartment list.

In the above embodiment, the parking compartment detector 15 may also determine whether or not another vehicle is parked in the detected parking compartment L. For example, the parking compartment detector 15 may detect whether or not another vehicle is parked in the detected parking compartment L based on detection results of the distance measuring sensor. Alternatively, the parking compartment detector 15 may previously store characteristics of the vehicle and perform an image recognition process based on the stored characteristics of the vehicle. In any case, the parking compartment detector 15 may determine whether or not another vehicle is parked in the detected parking compartment L based on a position relation between the detected another vehicle and the detected parking compartment L.

In the above embodiment, the parking compartment detector 15 may also determine whether or not another vehicle is parked. For example, the parking compartment detector 15 may detect whether or not another vehicle is parked in the detected parking compartment L based on detection results of the distance measuring sensor. Alternatively, the parking compartment detector 15 may previously store characteristics of the vehicle and perform an image recognition process based on the stored characteristics of the vehicle. In any case, the parking compartment detector 15 may determine whether or not another vehicle is parked in the detected parking compartment L based on a position relation between the detected another vehicle and the detected parking compartment L.

In the above embodiment, a case in which when the parking compartment detector 15 detects the parking compartment L, the parking reference position and two starting points of two border lines B are recorded in the compartment list 18 has been described. However, the invention is not limited thereto. The parking compartment detector 15 does not have to record the two starting points of the two border lines B in the compartment list 18. That is, the parking compartment detector 15 may detect the parking reference position S as a reference to determine whether or not parking of the vehicle 9 has been completed when parking the vehicle 9 from the images acquired by the cameras 3. The parking compartment recognition apparatus 1 operates as a parking position recognition apparatus that detects the parking reference position S from the frames captured by the selected cameras. In this case, description of the parking compartment in each functional block of the parking compartment recognition apparatus 1 described in the above embodiment may be replaced with description of the parking reference position S.

In the above embodiment, a case in which the detection setter 12 determines the detailed mode and the simple mode has been described. However, the invention is not limited thereto. The detection setter 12 may determine a first mode and a second mode that have different detection conditions of the parking compartment based on the traveling state of the vehicle 9. When the first mode is selected, the parking compartment detector 15 may detect the parking compartment from the frames generated by the selected cameras in a first predetermined condition. When the second mode is selected, the parking compartment detector 15 may detect the parking compartment from the frames generated by the selected cameras in a second condition different from the first condition. Even in this case, since the processing contents of detecting the parking compartment can be changed based on the traveling state of the vehicle 9, the load for detecting the parking compartment can be reduced.

In the image processing apparatus described in the above embodiment, each functional block may be individually integrated into a single chip by a semiconductor device, such as an LSI. Alternatively, a part or all of the functional blocks may be integrated into a single chip. Although the semiconductor device is the LSI here, but the semiconductor device is also referred to an IC, a system LSI, a super LSI and an ultra LSI depending on an integration degree.

A circuit integration method is not limited to the LSI, and may be realized by a dedicated circuit or a general-purpose processor. After manufacturing the LSI, the FPGA or a configurable processor may be used.

Each functional block process of the above each embodiment may be partially or completely implemented by a program. Each functional block process of the above each embodiment is partially or completely performed by a central processing unit (CPU) in a computer. The program for performing each process is stored in a storage device, such as a hard disk or a ROM, and is read from the ROM to the RAM and executed.

Each process of the above each embodiment may be implemented by hardware or software (including an operation system (OS), middleware or cases that are implemented with a predetermined library). Furthermore, each process of the above each embodiment may be implemented by both software and hardware.

For example, when each functional block of the above embodiments (including modifications) is implemented by software, each functional part may be implemented by a software process by using the hardware to which the CPU, the ROM, the RAM, an input part, an output part, and the like, are connected by a bus.

An execution order of a process method in the above embodiments is not necessarily limited to description of the above embodiments, and the execution order can be changed without departing from the scope of the invention.

A computer program causing a computer to execute the above described method and a computer-readable recording medium recording the program are included in the scope of the invention. Here, examples of the computer-readable recording medium include a flexible disk, a hard disk, a CD-ROM, an MO, a DVD, a DVD-ROM, a DVD-RAM, a high-capacity DVD, a next-generation DVD and a semiconductor memory.

The computer program is not limited to the program recorded in the above recording medium, and may be transmitted through an electronic communication line, wireless or wire communication line, a network, etc. represented by the Internet.

Heretofore, the embodiments of the invention have been described. However, the embodiments described above are merely examples for implementing the invention. Thus, the invention is not limited to the embodiments described above, and can be appropriately modified and implemented without departing from the gist of the invention.

[Additional Statement]

A parking compartment recognition apparatus may be configured by the following first to ninth configurations.

In the first configuration, the parking compartment recognition apparatus includes an image acquisition part, a detection setter and a parking compartment detector. The image acquisition part acquires a plurality of images from a plurality of cameras to be mounted on a vehicle. The detection setter selects the cameras to be used for detecting a parking compartment from among the plurality of cameras based on a traveling state of the vehicle. The parking compartment detector acquires the images generated by the selected cameras from the image acquisition part, and detects the parking compartment from the acquired images.

According to the first configuration, since the images to be used for detecting the parking compartment are changed according to the traveling state of the vehicle, a load for detecting the parking compartment can be reduced.

The second configuration is the first configuration, wherein the number of the selected cameras is smaller than the number of the plurality of cameras.

According to the second configuration, even when the parking compartment detector cannot simultaneously detect the parking compartment from the plurality of images generated by the plurality of cameras, the parking compartment can be detected.

The third configuration is the second configuration, wherein the detection setter selects the cameras to be used based on a speed of the vehicle.

According to the third configuration, the images to be used for detecting the parking compartment are changed according to the speed of the vehicle.

The fourth configuration is the first or second configuration, wherein the detection setter selects the cameras to be used based on a rotation angle of a steering wheel of the vehicle or an angle of a steered wheel of the vehicle.

According to the fourth configuration, the images to be used for detecting the parking compartment are changed based on the angles of the steering wheel or the steered wheel.

The fifth configuration is one of the second to fourth configurations, wherein the detection setter selects a first to a third cameras, assigns the first camera and the second camera to a first detector and assigns the third camera to a second detector. The parking compartment detector includes the first detector and the second detector. The first detector alternately repeats a process for detecting the parking compartment from the images generated by the first camera and the process for detecting the parking compartment from the images generated by the second camera. The second detector detects a parking area from the images generated by the third camera.

According to the fifth configuration, the first detector alternately switches among the cameras to be used for detecting the parking compartment. As a result, it is possible to select the cameras more in number than the detectors.

The sixth configuration is the fifth configuration, wherein the plurality of cameras includes a left side camera and a right side camera. The left side camera captures a left side view of the vehicle. The right side camera captures a right side view of the vehicle. When the speed of the vehicle is greater than a first predetermined reference value and the vehicle is moving forward, the detection setter selects the left side camera and the right side camera.

According to the sixth configuration, when the vehicle is traveling on a traveling road in a parking lot, the left side camera and the right side camera can detect more parking compartments L than a front camera and a rear camera. When the speed of the vehicle is greater than the first reference value, the detection setter selects the left side camera and the right side camera so as to detect more parking compartments.

The seventh configuration is the fifth configuration or the sixth configuration, wherein the parking compartment detector includes the first detector and the second detector. The plurality of cameras includes the left side camera, the right side camera and the rear camera. The left side camera captures the left side view of the vehicle. The right side camera captures the right side view of the vehicle. The rear camera captures a rear view of the vehicle. When the speed of the vehicle is within a predetermined speed range and a steering angle of the vehicle is smaller than a predetermined angle, the detection setter assigns the left side camera and the right side camera to the first detector and assigns the rear camera to the second detector. When the speed of the vehicle is within a predetermined speed range and the steering angle is equal to or greater than the predetermined angle, the detection setter assigns the camera that is located outside a turning track of the vehicle among the left side camera and the right side camera to the first detector, and assigns the rear camera to the second detector. The first detector and the second detector respectively detect the parking compartment from the frames generated by the cameras assigned by the detection setter.

According to the seventh configuration, it is possible to detect the parking compartment in which the vehicle 9 is most likely to be parked.

The eighth configuration is one of the fifth to seventh configurations, wherein the plurality of cameras includes the left side camera, the right side camera and the rear camera. The left side camera captures the left side view of the vehicle. The right side camera captures the right side view of the vehicle. The rear camera captures the rear view of the vehicle. When the vehicle is moving backward and is located outside the parking compartment, the detection setter selects the rear camera. When the vehicle is moving backward and is located within the parking compartment, the detection setter selects the left side camera and the right side camera.

According to the eighth configuration, when the vehicle is moving backward and is located outside the parking compartment, the rear camera is selected. As a result, the parking compartment to park the vehicle can be detected with a high accuracy. When the vehicle is moving backward and is located within the parking compartment, the left side camera and the right side camera area selected. As a result, it is possible to capture an image of an entire white line that specifies the parking compartment, so that this parking compartment can be detected.

In the ninth configuration, a parking position recognition apparatus includes an image acquisition part, a detection setter and a reference position detector. The image acquisition part acquires a plurality of images from a plurality of cameras to be mounted on a vehicle. The detection setter selects the cameras to be used for detecting a parking reference position from among the plurality of cameras based on a traveling state of the vehicle. The reference position detector acquires the images generated by the selected cameras from the image acquisition part, and detects the parking reference position from the acquired images.

According to the ninth configuration, since the images to be used for detecting the parking reference position are changed according to the traveling state of the vehicle, a load for detecting the parking reference position can be reduced.

A parking compartment recognition method to be used in a parking compartment recognition apparatus 1 may include the following step (a), step (b) and step (c). The step (a) acquires a plurality of images from a plurality of cameras to be mounted on a vehicle. The step (b) selects the cameras to be used for detecting a parking compartment from among the plurality of cameras based on a traveling state of the vehicle. The step (c) selects the images generated by the selected cameras from among the acquired images, and detects the parking compartment from the selected images.

The parking compartment recognition apparatus 1 may be configured by the following tenth to eighteenth configurations.

In the tenth configuration, a parking compartment recognition apparatus recognizes a parking compartment by using images generated by at least one camera to be mounted on a vehicle. The parking compartment recognition apparatus includes an image acquisition part, a detection setter and a parking compartment detector. The image acquisition part acquires the images from at least one camera. The detection setter selects a detection mode for detecting the parking compartment from the acquired images from among a first mode and a second mode based on a traveling state of the vehicle. When the detection setter selects the first mode, the parking compartment detector detects the parking compartment from the acquired images in a first predetermined condition. When the detection setter selects the second mode, the parking compartment detector detects the parking compartment from the acquired images in a second condition different from the first condition.

According to the tenth configuration, since the detection mode is changed based on the traveling state of the vehicle. Therefore, it is possible to reduce a processing load for detecting the parking compartment without lowering detection accuracy of the parking compartment.

The eleventh configuration is the tenth configuration, wherein the parking compartment detector includes a detection area specifying part. When the detection setter selects the first mode, the detection area specifying part specifies a predetermined detection area in the acquired images. When the detection setter selects the second mode, the detection area specifying part specifies a detection area based on the already detected parking compartment. The parking compartment detector detects the parking compartment from the detection area specified by the acquired images.

According to the eleventh configuration, when the second mode is selected, the detection area is detected based on the already detected parking compartment, so that the parking compartment can be immediately detected.

The twelfth configuration is the tenth or eleventh configuration, wherein the parking compartment detector includes a border-line detector and a compartment determiner. The border-line detector selects attention pixels in the acquired images and determines whether or not an edge is formed by the attention pixels so as to detect a border line that is at least a part of an outline of a compartment line showing a range of the parking compartment. The compartment determiner determines the parking compartment based on the detected border line. A selection interval of the attention pixels in a case where the second mode is selected is narrower than the selection interval of the attention pixels in a case where the first mode is selected.

According to the twelfth configuration, when the second mode is selected, the parking compartment can be detected with a higher accuracy than when the first mode is detected.

The thirteenth configuration is the twelfth configuration, wherein the detection area that is specified when the first mode is selected is wider than the detection area that is specified when the second mode is selected.

According to the thirteenth configuration, the detection area that is specified when the first mode is selected is wider than the detection area that is specified when the second mode is selected. Therefore, it is possible to detect the parking compartment from a wide area. Different from when the second mode is selected, when the first mode is selected, a new parking compartment can be detected.

The fourteenth configuration is the eleventh configuration, wherein the border-line detector detects two border lines of the compartment line extending in a long-side direction. When the two border lines are parallel and a distance between the two border lines is within a predetermined range, the compartment determiner determines that the parking compartment has been detected based on the two border lines.

According to the fourteenth configuration, the parking compartment is detected based on a position relation between the detected two border lines. Since lengths of the two border lines do not have to be used for detecting the parking compartment, even when a part of the white line is hidden by an obstacle, the parking compartment can be detected. For example, the parking compartment in which another vehicle has been already parked can be detected.

The fifteenth configuration is the tenth configuration, wherein when the first mode is selected, the parking compartment detector detects the border line that is at least a part of the outline of the compartment line separating the parking compartments from the images with a predetermined accuracy, and determines the parking reference position based on the detected border line. When the second mode is selected, the parking compartment detector specifies the detection area based on the already detected parking reference position, detects the border line from the detection area with a higher accuracy than the predetermined accuracy, and determines the parking reference position based on the detected border line. The parking reference position is a reference position for stopping the vehicle within the parking compartment.

According to the fifteenth configuration, when the second mode is selected, the parking compartment detector specifies the detection area based on the already detected parking reference position, and determines the parking reference position based on the border line detected form the detection area. As a result, it is possible to determine the parking reference position of the parking compartment detected in the first mode with a further higher accuracy.

The sixteenth configuration is the tenth configuration, wherein the detection setter selects the detection mode based on at least one of the speed of the vehicle, the steering angle of the vehicle and a position of the vehicle.

According to the sixteenth configuration, the detection mode can be immediately changed according to a change in the traveling state of the vehicle.

In the seventeenth configuration, a parking position recognition apparatus recognizes a parking reference position by using images generated by at least one camera to be mounted on a vehicle. The parking position recognition apparatus includes an image acquisition part, a detection setter and a reference position detector. The image acquisition part acquires the images from at least one camera. The detection setter selects a detection mode for detecting the parking reference position from the acquired images from among a first mode and a second mode based on the traveling state of the vehicle. When the detection setter selects the first mode, the reference position detector detects the parking reference position from the acquired images in a first predetermined condition. When the detection setter selects the second mode, the reference position detector detects the parking reference position from the acquired images in a second condition different from the first condition.

According to the seventeenth configuration, the detection mode is changed based on the traveling state of the vehicle. Therefore, it is possible to reduce a processing load for detecting the parking reference position without lowering detection accuracy of the parking reference position.

A parking compartment recognition apparatus according to the eighteenth configuration may execute a parking compartment recognition method including a step (a), a step (b) and a step (c). The step (a) acquires images from at least one camera. The step (b) selects a detection mode for detecting a parking compartment from the acquired images from among a first mode and a second mode based on a traveling state of a vehicle. When the first mode is selected, the step (c) detects the parking compartment from the images acquired in a first predetermined condition. When the second mode is selected, the step (c) detects the parking compartment from the images acquired in a second condition different from the first condition.

While the invention has been shown and described in detail, the foregoing description is in all aspects illustrative and not restrictive. It is therefore understood that numerous other modifications and variations can be devised without departing from the scope of the invention.

What is claimed is:

1. A parking space recognition apparatus that recognizes a parking space, the apparatus comprising:
   an image acquisition part that acquires a plurality of images generated by a plurality of cameras provided on a vehicle including (i) a left side camera capturing a left side view of the vehicle, (ii) a right side camera capturing a right side view of the vehicle and (iii) a rear camera capturing a rear view of the vehicle;

a detection setter that selects the cameras to be used for detecting the parking space from among the plurality of cameras based on a traveling state of the vehicle, and selects a detection mode for detecting the parking space from the images generated by the selected cameras from among a first mode and a second mode based on the traveling state of the vehicle;

a detection area specifying part that specifies a first detection area in the images generated by the selected cameras among the plurality of images acquired by the image acquisition part when the detection setter selects the first mode, and specifies a second detection area narrower than the first detection area in the images generated by the selected cameras when the detection setter selects the second mode; and a parking space detector that detects the parking space from the first detection area specified by the detection area specifying part with a first accuracy when the detection setter selects the first mode, and detects the parking space from the second detection area specified by the detection area specifying part with a second accuracy when the detection setter selects the second mode.

2. The parking space recognition apparatus according to claim 1, wherein
the parking space detector includes a first detector and a second detector, the detection setter assigns one or more of the cameras among the plurality of cameras to each of the first detector and the second detector, and the first detector and the second detector detect the parking space temporally in parallel.

3. The parking space recognition apparatus according to claim 2, wherein
the detection setter assigns the left side camera and the right side camera to the first detector and assigns the rear camera to the second detector, the first detector alternately repeats a process for detecting the parking space from the images generated by the left side camera and the process for detecting the parking space from the images generated by the right side camera, and the second detector detects the parking space from the images generated by the rear camera.

4. The parking space recognition apparatus according to claim 2, wherein
when a speed of the vehicle is within a predetermined speed range and a steering angle of the vehicle is smaller than a predetermined angle, the detection setter assigns the left side camera and the right side camera to the first detector and assigns the rear camera to the second detector,
when the speed of the vehicle is within the predetermined speed range and the steering angle is equal to or greater than the predetermined angle, the detection setter assigns one of the cameras that is located outside a turning track of the vehicle among the left side camera and the right side camera to the first detector, and assigns the rear camera to the second detector, and
the first detector and the second detector respectively detect the parking space from the images generated by the cameras assigned by the detection setter.

5. The parking space recognition apparatus according to claim 1, wherein
the parking space detector includes (i) a border-line detector that selects attention pixels in the first detection area and the second detection area and determines whether or not an edge is formed by the selected attention pixels so as to detect a border line that is at least a part of an outline of a parking space line showing a range of the parking space, and (ii) a parking space determiner that determines the parking space based on the detected border line, and a selection interval of the attention pixels in a case where the second mode is selected is narrower than the selection interval of the attention pixels in a case where the first mode is selected.

6. The parking space recognition apparatus according to claim 1, wherein
when the first mode is selected, the parking space detector detects a border line that is at least a part of an outline of a parking space line showing a range of the parking space from the images with the first accuracy, and determines a parking reference position based on the detected border line;
when the second mode is selected, the detection area specifying part specifies the second detection area based on end points of a previously detected border line detected in the first mode;
when the second mode is selected, the parking space detector detects the border line from the second detection area specified by the detection area specifying part with the second accuracy, and determines the parking reference position based on the detected border line; and
the parking reference position is a reference position for stopping the vehicle within the parking space.

7. A parking space recognition method for recognizing a parking space; the method comprising the steps of:
(a) acquiring a plurality of images generated by a plurality of cameras provided on a vehicle including (i) a left side camera capturing a left side view of the vehicle, (ii) a right side camera capturing a right side view of the vehicle and (iii) a rear camera capturing a rear view of the vehicle;
(b) selecting the cameras to be used for detecting the parking space from among the plurality of cameras based on a traveling state of the vehicle, and selecting a detection mode for detecting the parking space from the images generated by the selected cameras from among a first mode and a second mode based on the traveling state of the vehicle;
(c) specifying a first detection area in the images generated by the selected cameras among the plurality of acquired images when the first mode is selected, and specifying a second detection area narrower than the first detection area in the images generated by the selected cameras when the second mode is selected; and
(d) detecting the parking space from the first detection area with a first accuracy when the first mode is selected, and detecting the parking space from the second detection area with a second accuracy when the second mode is selected.

8. A parking space recognition apparatus that recognizes a parking space; the apparatus comprising a processor programmed to:
(a) acquire a plurality of images generated by a plurality of cameras provided on a vehicle including (i) a left side camera capturing a left side view of the vehicle, (ii) a right side camera capturing a right side view of the vehicle and (iii) a rear camera capturing a rear view of the vehicle;

(b) select the cameras to be used for detecting the parking space from among the plurality of cameras based on a traveling state of the vehicle, and select a detection mode for detecting the parking space from the images generated by the selected cameras from among a first mode and a second mode based on the traveling state of the vehicle;

(c) specify a first detection area in the images generated by the selected cameras among the plurality of acquired images when the first mode is selected, and specifying a second detection area narrower than the first detection area in the images generated by the selected cameras when the second mode is selected; and (d) detect the parking space from the first detection area with a first accuracy when the first mode is selected, and detect the parking space from the second detection area with a second accuracy when the second mode is selected.

* * * * *